(12) United States Patent
Zou et al.

(10) Patent No.: US 11,659,633 B2
(45) Date of Patent: May 23, 2023

(54) MICROWAVE DETECTOR AND MANUFACTURING METHOD THEREOF AND STRAY ELECTROMAGNETIC RADIATION SUPPRESSION METHOD

(71) Applicant: Gaodi Zou, Shenzhen (CN)

(72) Inventors: Gaodi Zou, Shenzhen (CN); Xin Zou, Shenzhen (CN)

(73) Assignee: Gaodi Zou, Guangdong (CN)

( * ) Notice: Subject to any disclaimer, the term of this patent is extended or adjusted under 35 U.S.C. 154(b) by 498 days.

(21) Appl. No.: 16/967,409

(22) PCT Filed: May 31, 2019

(86) PCT No.: PCT/CN2019/089440
§ 371 (c)(1),
(2) Date: Aug. 4, 2020

(87) PCT Pub. No.: WO2002/022042
PCT Pub. Date: Nov. 5, 2020

(65) Prior Publication Data
US 2021/0243856 A1 Aug. 5, 2021

(30) Foreign Application Priority Data

Apr. 28, 2019 (CN) .......................... 201910350148.0

(51) Int. Cl.
*H05B 6/64* (2006.01)
*H05B 6/68* (2006.01)
*H05B 6/70* (2006.01)

(52) U.S. Cl.
CPC ............. *H05B 6/6447* (2013.01); *H05B 6/68* (2013.01); *H05B 6/705* (2013.01)

(58) Field of Classification Search
CPC ........ H05B 6/6447; H05B 6/68; H05B 6/705; G01V 3/12; G01V 8/005; H01Q 1/526; H01Q 23/00; H01Q 9/0407
(Continued)

(56) References Cited

U.S. PATENT DOCUMENTS 9,531,056 B2 * 12/2016 Liu ........................ H01Q 1/243

FOREIGN PATENT DOCUMENTS

CN         109546336 A * 3/2019 ............... H01Q 1/36

* cited by examiner

*Primary Examiner* — Quang T Van
(74) *Attorney, Agent, or Firm* — Raymond Y Chan; David and Raymond Patent Firm

(57) ABSTRACT

The present invention discloses a microwave detector and manufacturing method thereof and stray electromagnetic radiation suppression method, wherein the microwave detector includes a reference ground, a radiation source, a driving circuit, and at least a set of suppression fence posts. The driving circuit is electrically connected with the feed point of the radiating source, wherein the radiating source, the reference ground and the driving circuit are arranged in order along the thickness direction of the microwave detector. The radiation source and the reference ground are separated and spaced to form and define a radiating gap between the radiation source and the reference ground, wherein a spacing distance between the reference ground and the driving circuit is greater than or equal to $1/128\lambda$, wherein $\lambda$ is the wavelength of the radiated wave of the microwave detector. The set of suppression fence posts surrounds the driving circuit in such a manner that the suppression fence posts are respectively and spacingly arranged on the side portions of the driving circuit.

31 Claims, 19 Drawing Sheets

(58) Field of Classification Search
USPC ....... 219/679, 678, 680, 715, 716, 721, 736, 219/737, 738, 761
See application file for complete search history.

MICROWAVE DETECTOR AND MANUFACTURING METHOD THEREOF AND STRAY ELECTROMAGNETIC RADIATION SUPPRESSION METHOD

BACKGROUND OF THE PRESENT INVENTION

Field of Invention

The present invention relates to antenna technology, and more particularly to a microwave detector and manufacturing method thereof and stray electromagnetic radiation suppression method.

Description of Related Arts

With developing and popularizing of IOT (Internet of things), IOT applications in the field of Artificial Intelligence (AI) and intelligent home have become more and more common. Here, radiological technologies including radio detecting methods based on Doppler Effect are especially widely utilized since they are capable of serving as a critical connection between humans and/or objects. The ISM (Industrial Scientific Medical) Bands, defined by the ITU-R (ITU Radio Communication Sector), are the bands opened for organizations of industry, science and medical purposes without licensing required. Some bands in the ISM bands opened by ITU-R and applied in microwave detection include 2.4 GHz, 5.8 GHz, 10.525 GHz, 24.125 GHz, and etc. Corresponding microwave detectors in the bands need to be limited in a certain regulated emissive power (generally less than 1 W) in order to reduce the interference to other radio devices. Although the definitions and the licenses of the bands could regularize the use of the bands to decrease the risk of interference to radio devices in different bands, nevertheless unilateral or bilateral interferences may still occur between radio devices of various bands, such as microwave detectors of different bands, due to stray electromagnetic radiation. Especially, within the limited licensed bands, increasing coverage rate of the used radio bands can render more and more serious problems in unilateral or bilateral interferences between radio devices of different bands.

Besides, because the radio technology in the same time are the essence of information transfer in the field of communication, the ability of anti-interference thereof relates to the safety of the economy and national defense. Therefore, there are corresponding national and international certification standards of the ability of anti-interference in the field of radio technology, such as RED certification in the Europe Union (EU) and FCC certification in the United States (U.S.) which require the limitation of harmonic of stray electromagnetic radiation. In other word, even though the microwave detectors based on the theory of Doppler Effect use some bands which require no license, the problems thereof about unilateral or bilateral interference between radio equipment in different bands should be dealt with, as well as the problems about the certification standard international and respective countries and regions.

Conventional microwave detector comprises a radiation source, a reference ground and a driving circuit, wherein the radiation source and the reference ground are spacingly arranged in order to form and define a radiating clearance. The driving circuit is installed at the same side of the reference ground and is electrically connected with a feed point of the radiation source. The driving circuit provides microwave excitation electrical signal from the feed point of the radiation source to the radiation source, so that the microwave detector radiates waves due to the cooperation between the radiation source and the reference ground. Unfortunately, the driving circuit also radiates stray electromagnetic radiation at the same time from the reference ground to the driving circuit, diffusing out from the gap between the reference ground and the driving circuit, which can permeates through other radio devices of different bands from the microwave detector, such as permeating through other microwave detector of a different band from the microwave detector causing interference.

In other words, because of the existence of the stray electromagnetic radiation, conventional microwave detector would cause unilateral or bilateral interference to other radio devices of different band including other microwave detectors of different bands. This problem becomes more and more serious day by day, resulting that it is so difficult for the conventional devices to meet the requirement of the RED certification of the EU and the FCC certification of the U.S. regarding the restriction of the harmonic wave from stray electromagnetic radiation.

SUMMARY OF THE PRESENT INVENTION

The invention is advantageous in that it provides a microwave detector and manufacturing method thereof and stray electromagnetic radiation suppression method, wherein when a driving circuit of the microwave detector provides microwave excitation electrical signal to a radiation source, any stray electromagnetic radiation generated at the same time can be suppressed effectively.

The invention is advantageous in that it provides a microwave detector and manufacturing method thereof and stray electromagnetic radiation suppression method, wherein the microwave detector provides at least one set of suppression fence posts, wherein the set of the suppression fence posts surrounds the driving circuit in a manner that the suppression fence posts are spacingly and intervally arranged around side portions of the driving circuit towards a direction of a reference ground of the microwave detector, so as to suppress the stray electromagnetic radiation generated by the driving circuit with one set of the suppression fence posts.

The invention is advantageous in that it provides a microwave detector and manufacturing method thereof and stray electromagnetic radiation suppression method, wherein the microwave detector includes at least one row of suppression dams, wherein the row of the suppression dams is mounted between adjacent circuit modules of the driving circuit, so as to suppress the stray electromagnetic radiation generated by the driving circuit and lower the interference to other adjacent circuit modules caused by the stray electromagnetic radiation generated by the driving circuit.

The invention is advantageous in that it provides a microwave detector and manufacturing method thereof and stray electromagnetic radiation suppression method, wherein the microwave detector provides a shield member, arranged to cover the driving circuit, so as to suppress the stray electromagnetic radiation generated by the driving circuit.

The invention is advantageous in that it provides a microwave detector and manufacturing method thereof and stray electromagnetic radiation suppression method, wherein the shield member has at least two adjacent shielded spaces respectively corresponding to different circuit modules of the driving circuit, so that the shield member is able to divide and separate the adjacent circuit modules of the driving circuit thereby, so as to suppress the interference to other adjacent circuit modules caused by the stray electromagnetic radiation generated by the driving circuit.

The invention is advantageous in that it provides a microwave detector and manufacturing method thereof and stray electromagnetic radiation suppression method, wherein the span between the reference ground and the driving circuit is decreased, so as to suppress the stray electromagnetic radiation generated by the driving circuit.

The invention is advantageous in that it provides a microwave detector and manufacturing method thereof and stray electromagnetic radiation suppression method, wherein at least one shielded space of the shield member further comprises a wave absorption material arranged therein, adapted for absorbing stray electromagnetic radiation, so as to deplete and reduce the interference to the driving circuit and the adjacent circuit module(s) rendered by the secondary reflection of the stray electromagnetic radiation generated by the circuit module in the shielded space.

According to an aspect of the present invention, it provides a microwave detector, which comprises:

a reference ground;

a radiation source, having a feed point;

a driving circuit electrically connected with the feed point of the radiating source, wherein the radiating source, the reference ground and the driving circuit are arranged and disposed in order along a thickness direction of the microwave detector, wherein the radiation source and the reference ground are separated and spaced so as to form and define a radiating clearance between the radiation source and the reference ground, wherein a spacing distance between the reference ground and the driving circuit is greater than or equal to $\frac{1}{128}\lambda$, wherein $\lambda$ is the wavelength of the radiated wave of the microwave detector; and at least one set of suppression fence posts, wherein the suppression fence posts are respectively and spacingly and intervally arranged around side portions of the driving circuit to surround the driving circuit.

In one embodiment of the present invention, the microwave detector further comprises an upper base layer and a lower base layer, wherein the upper base layer has an attaching side and a mounting side corresponding to the attaching side, wherein the radiation source is retained on an attaching side of the upper base layer, wherein the lower base layer has an upper surface and a lower surface corresponding to the upper surface, wherein the reference ground is retained on the upper surface of the lower base layer and the driving circuit is retained on the lower surface of the lower base layer, such that the lower base layer separates the reference ground and the driving circuit, wherein the mounting side of the upper base layer is mounted on the reference ground, so as to allow the upper base layer to form and define the radiating clearance.

In one embodiment of the present invention, the microwave detector further comprises an etched layer, which comprises a peripheral portion, laminated on the lower surface of the lower base layer in such a manner that the peripheral portion surrounds the driving circuit, wherein the suppression fence posts of the set of the suppression fence posts are respectively extended from the peripheral portion toward the direction of the reference ground.

In one embodiment of the present invention, the etched layer comprises at least a partition portion, layered on the lower surface of the lower base layer in the manner of separating adjacent circuit modules of the driving circuit, wherein the microwave detector further comprises at least a row of suppression dams, extended from the partition portion toward the direction of the reference ground in such a manner that the suppression dams are spacingly and intervally arranged with each other so as to separate the adjacent circuit modules of the driving circuit.

In one embodiment of the present invention, the microwave detector further comprises at least a row of suppression dams extended from the lower surface of the lower base layer toward the direction of the reference ground in such a manner that the suppression dams are spacingly and intervally arranged with each other so as to separate the adjacent circuit modules of the driving circuit.

In one embodiment of the present invention, each of the suppression fence posts of the set of the suppression fence posts is extended from the peripheral portion to the reference ground.

In one embodiment of the present invention, each of the suppression fence posts of the set of the suppression fence posts is extended from the peripheral portion to the reference ground, wherein each of the suppression dams of the row of the suppression dams is extended from the partition portion to the reference ground.

In one embodiment of the present invention, each of the suppression fence posts of the set of the suppression fence posts is extended from the peripheral portion to the reference ground, wherein each of the suppression dams of the row of the suppression dams is extended from the lower surface of the lower base layer to the reference ground.

In one embodiment of the present invention, the upper base layer is layered on the reference ground.

In one embodiment of the present invention, the microwave detector further comprises a shield member, wherein the shield member comprises a shield wall and has a shielded space defined by the shield wall, wherein the shield member is arranged in such a manner that the shield wall is corresponding to a set of the suppression fence posts, so as to allow the driving circuit being disposed in the shielded space that is further defined by the suppression fence posts and the reference ground.

In one embodiment of the present invention, the microwave detector further comprises a shield member, wherein the shield member comprises a shield wall, at least a division member arranged on the shield wall, and at least two independent shielded spaces formed and defined by the shield wall and the division member, wherein the shield member is arranged in such a manner that, the shield wall is corresponding to a set of the suppression fence posts and the division member is corresponding to a row of the suppression dams, so as to allow every circuit module of the driving circuit to be respectively disposed in the corresponding shielded space of the shield member.

In accordance with another aspect of the invention, the present invention further provides a manufacturing method of microwave detector, comprising the following steps:

(a) etching a second metal layer that is attached on an upper surface of a lower base layer, so as to allow the second metal layer to form a notch, and etching a third metal layer that is attached on a lower surface of the lower base layer, so as to allow the third metal layer forming a driving circuit;

(b) forming at least a set of suppression fence posts surrounding at least one side of the driving circuit;

(c) allowing a mounting side of an upper base layer, which has a first metal layer attached on an attaching side thereof, being mounted on the second metal layer; and (d) forming an electrical connection element extended from the first metal layer to the driving circuit via the notch of the second metal layer, so as to make the microwave detector, wherein the first metal layer forms a radiation source of the microwave detector, the second metal layer forms a reference ground of the microwave detector, and the upper base layer forms a radiating clearance of the microwave detector.

In one embodiment of the present invention, the step (c) is prior to the step (d), such that the mounting side of the upper base layer is mounted on the second metal layer first, and then the set of suppression fence posts is formed around the side portions of the driving circuit.

In one embodiment of the present invention, in the step (a), the middle portion of the third metal layer is etched, so that a periphery of the third metal layer forms a peripheral portion surrounding the driving circuit, which allows the suppression fence posts of the set of suppression fence posts to spacingly and intervally extended from the peripheral portion towards a direction of the second metal layer in the step (b).

In one embodiment of the present invention, in the step (a), the middle portion of the third metal layer is etched, so that a middle portion of the third metal layer forms at least a partition portion to separate and divide adjacent circuit modules of the driving circuit, such that, before the step (c), the manufacturing method further comprises a step of:

(e) forming at least a row of suppression dams from the partition portion to the second metal layer.

In one embodiment of the present invention, prior to the step (c), the manufacturing method further comprises a step of:

(f) forming at least a row of suppression dams from the lower surface of the lower base layer, extending toward the direction of the second metal layer, so as to divide the adjacent circuit modules of the driving circuit.

In one embodiment of the present invention, the step (b) and the step (e) are conducted at the same time, so as to simultaneously form the set of suppression fence posts and the row of suppression dams by, for example, Vertical Interconnect Access (VIA) and metallization through-VIA technology.

In one embodiment of the present invention, the step (b) and the step (f) are conducted at the same time, so as to simultaneously form a set of the suppression fence posts and a row of the suppression dams by, for example, VIA and metallization through-VIA technology.

In one embodiment of the present invention, the manufacture method further comprises a step of:

(g) arranging and covering a shield member on the driving circuit such that a shield wall of the shield member is corresponding to the set of suppression fence posts.

In one embodiment of the present invention, the manufacture method further comprises a step of:

(h) arranging and covering a shield member on the driving circuit such that a shield wall of the shield member is corresponding to the set of suppression fence posts and that a division member of the shield member is corresponding to the row of suppression dams.

In accordance with another aspect of the invention, the present invention further provides a stray electromagnetic radiation suppression method for microwave detector, comprising the following steps:

(A) arranging at least a set of suppression fence posts around a driving circuit of the microwave detector along at least one side of the driving circuit; and (B) preventing a stray electromagnetic radiation generated by the driving circuit from radiating to a direction of the at least one side of the driving circuit with the set of suppression fence posts when a microwave excitation electrical signal is provided from a feed point of a radiation source of the microwave detector to the radiation source by the driving circuit, so as to suppress the stray electromagnetic radiation generated by the driving circuit.

In one embodiment of the present invention, the stray electromagnetic radiation suppression method further comprises a step of:

(C) dividing adjacent circuit modules of the driving circuit so as to weaken the stray electromagnetic radiation generated by the driving circuit.

In one embodiment of the present invention, in the step (C), at least a row of suppression dams is formed between the adjacent circuit modules of the driving circuit, such that the row of suppression dams divides the adjacent circuit modules of the driving circuit.

In one embodiment of the present invention, in the step (C), each circuit module of the driving circuit is disposed and shielded in an independent shielded space of a shield member, so as to utilize the shield member to divide the adjacent circuit modules of the driving circuit.

In one embodiment of the present invention, in the step (C), each circuit module of the driving circuit is disposed and shielded in an independent shielded space of a shield member, so as to utilize the shield member to divide the adjacent circuit modules of the driving circuit.

According to another aspect of the present invention, it further provides a microwave detector, which comprises:

a reference ground;

a radiation source, having a feed point;

a driving circuit, electrically connected with the feed point of the radiating source, wherein the radiating source, the reference ground and the driving circuit are arranged and disposed in order along a thickness direction of the microwave detector, wherein the radiation source and the reference ground are separated and spaced so as to form and define a radiating clearance between the radiation source and the reference ground, wherein a spacing distance between the reference ground and the driving circuit is smaller than $1/128\lambda$, wherein $\lambda$ is the wavelength of the radiated wave of the microwave detector.

In one embodiment of the present invention, the microwave detector further comprises a shield member arranged to cover the driving circuit.

In one embodiment of the present invention, the shield member has at least two independent shielded spaces, wherein the driving circuit comprises at least two circuit modules, wherein the circuit modules of the driving circuit are respectively accommodated in the shielded spaces of the shield member.

DETAILED DESCRIPTION OF THE PREFERRED EMBODIMENT

Figure 1:
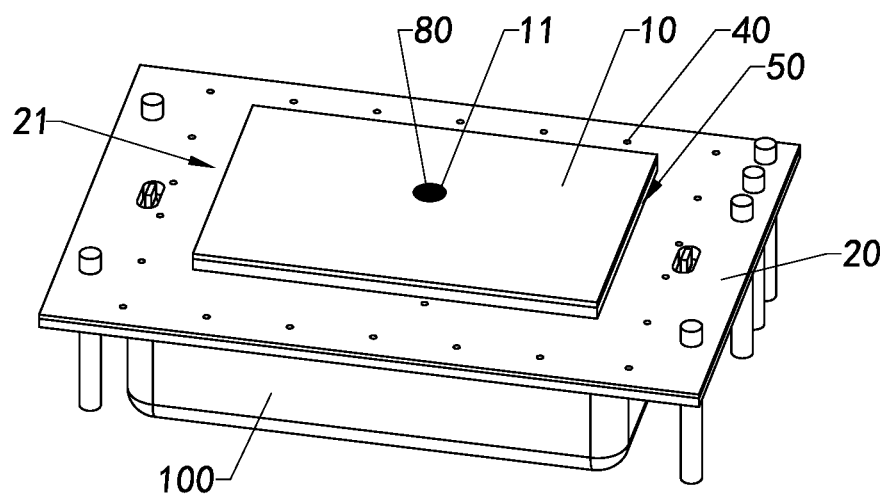
FIG. 1 is a perspective view of a microwave detector according to a preferred embodiment of the present invention.
Figure 2:
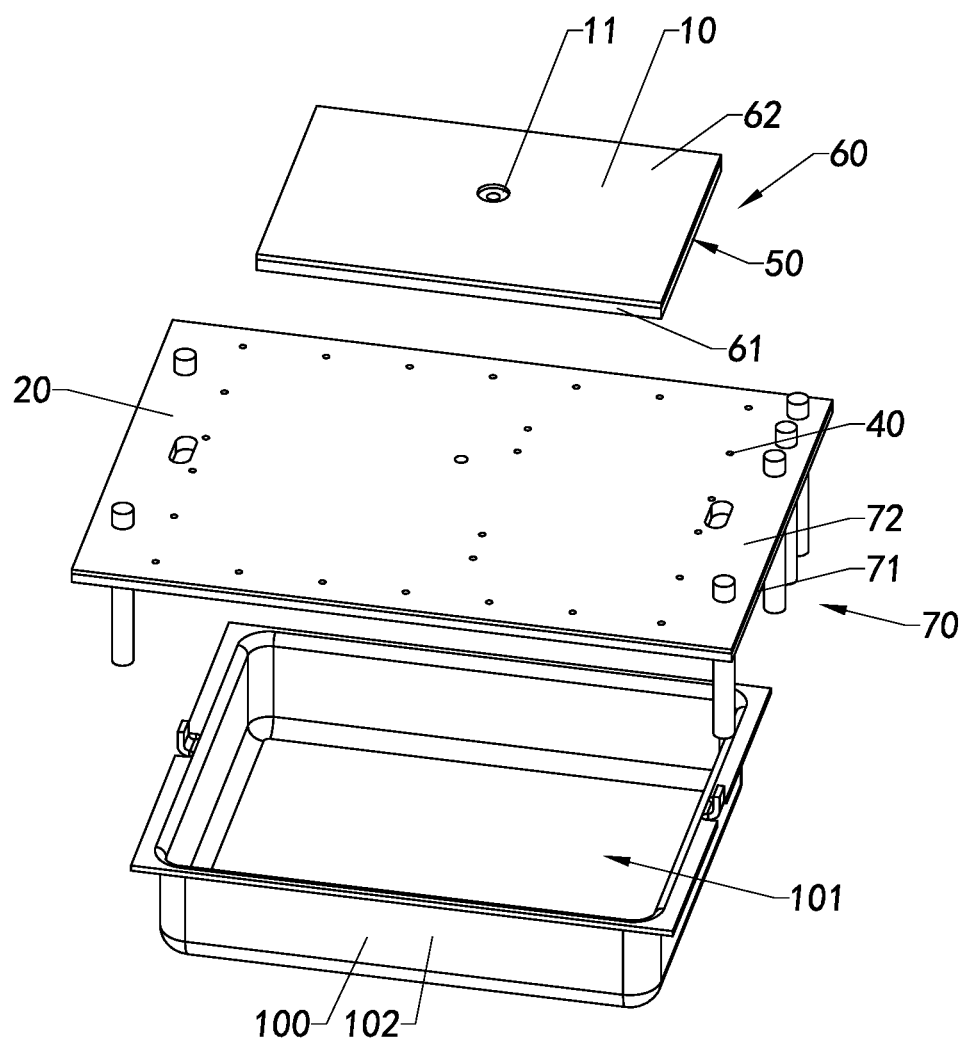
FIG. 2 is an exploded view of the microwave detector according to the above preferred embodiment of the present invention.

According to the disclosed contents of the specification and appended claims of the present invention, the technical solutions of the present invention are specified as follows.

Those skilled in the art should understand that, in the disclosure of the present invention, terminologies of "longitudinal," "lateral," "upper," "front," "back," "left," "right," "perpendicular," "horizontal," "top," "bottom," "inner," "outer," and etc. just indicate relations of direction or position are based on the relations of direction or position shown in the appended drawings, which is only to facilitate descriptions of the present invention and to simplify the descriptions, rather than to indicate or imply that the referred device or element must apply specific direction or to be operated or configured in specific direction. Therefore, the above-mentioned terminologies shall not be interpreted as confine to the present invention.

It is understandable that the term "a" should be understood as "at least one" or "one or more". In other words, in one embodiment, the number of an element can be one and in other embodiment the number of the element can be greater than one. The term "a" is not construed as a limitation of quantity.

Referring to FIGS. 1-4 of the present invention, a microwave detector according to a preferred embodiment of the present invention is disclosed and illustrated in the following description, wherein the microwave detector comprises a radiation source 10, a reference ground 20, a driving circuit 30, and at least a set of suppression fence posts 40.

In particular, the reference ground 20 has a first side 21 and a second side 22 corresponding to the first side 21. The radiation source 10 is provided and retained on the first side 21 of the reference ground 20. The radiation source 10 and the reference ground 20 are separated and spaced apart to form a radiating clearance 50 between the radiation source 10 and the reference ground 20 of the microwave detector. The driving circuit 30 is provided and retained on the second side 22 of the reference ground 20. The driving circuit 30 is electrically connected with a feed point 11 of the radiation source 10. The set of suppression fence posts 40 surrounds the driving circuit 30 in such a manner that the suppression fence posts 40 are spacingly and intervally arranged around side portions of the driving circuit 30. When the driving circuit 30 provides microwave excitation electrical signal from the feed point 11 of the radiation source 10 to the radiation source 10, the radiation source 10 and the reference ground 20 coordinate with each other to allow the microwave detector to produce radiated wave, wherein the set of suppression fence posts 40 can effectively suppress the stray electromagnetic radiation generated by the driving circuit 30.

More specifically, for the microwave detector according to the preferred embodiment as illustrated in FIGS. 1-4, the radiation source 10 has a radiation source surface 12, the reference ground 20 has a reference ground surface 23, and the radiation source surface 12 of the radiation source 10 and the reference ground surface 23 of the reference ground 20 are parallel with each other, so that the microwave detector has a flat panel shape. In other word, the microwave detector as illustrated in FIGS. 1-4 is a flat panel detector.

It is worth mentioning that the microwave detector illustrated in FIGS. 1-4 is described as a flat panel detector as an example, but it shall not be considered as limitation to the content and scope of the microwave detector of the present invention. For instance, according to other embodiments of the present invention, the microwave detector can be a columnar detector, which means that the extending direction of the radiation source 10 is perpendicular to the reference ground surface 23 of the reference ground 20.

Figure 6:
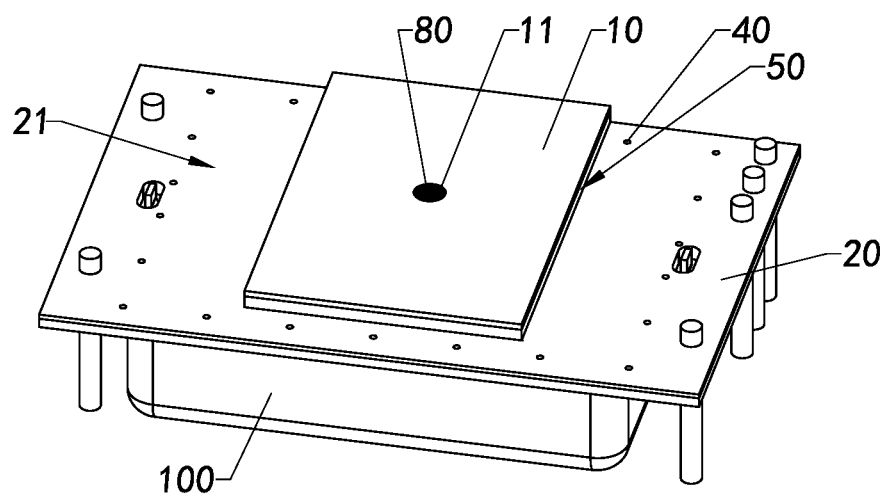
FIG. 6 is a perspective view of the microwave detector according to a first alternative mode of the above preferred embodiment of the present invention.

Referring to FIGS. 1-4, the peripheral edges around the radiation source 10 form a rectangle shape, so as to provide the radiation source 10 a length direction and a width direction. The peripheral edges around the reference ground 20 form a rectangle shape, so as to provide the reference ground 20 a length direction and a width direction. In which, the length direction of the radiation source 10 and the length direction of the reference ground 20 are consistent in the same direction. Correspondingly, the width direction of the radiation source 10 and the width direction of the reference ground 20 are consistent in the same direction. According to a first alternative mode of the microwave detector as illustrated in FIG. 6, the length direction of the radiation source 10 and the width direction of the reference ground 20 are consistent in the same direction, and correspondingly, the width direction of the radiation source 10 and the length direction of the reference ground 20 are consistent in the same direction.

Referring to FIGS. 1-4, the microwave detector further comprises an upper plate component 60 and a lower plate component 70. The upper plate component 60 comprises an upper base layer 61 and a first metal layer 62. The upper base layer 61 has an attaching side 611 and a mounting side 612 corresponding to the attaching side 611. The first metal layer 62 is attached on the attaching side 611 of the upper base layer 61. The lower plate component 70 comprises a lower base layer 71, a second metal layer 72 and a third metal layer 73. The lower base layer 71 has an upper surface 711 and a lower surface 712 corresponding to the upper surface 711. The second metal layer 72 is attached on the upper surface 711 of the lower base layer 71. The third metal layer 73 is attached on the lower surface 712 of the lower base layer 71.

It is worth mentioning that the first metal layer 62, the second metal layer 72 and the third metal layer 73 may be, but not limited to, copper plates, such that it may utilize copper plating technology to attach the first metal layer 62 on the attaching side 611 of the upper base layer 61, attach the second metal layer 72 on the upper surface 711 of the lower base layer 71, and attach the third metal layer 73 on the lower surface 712 of the lower base layer 71.

Figure 3A:
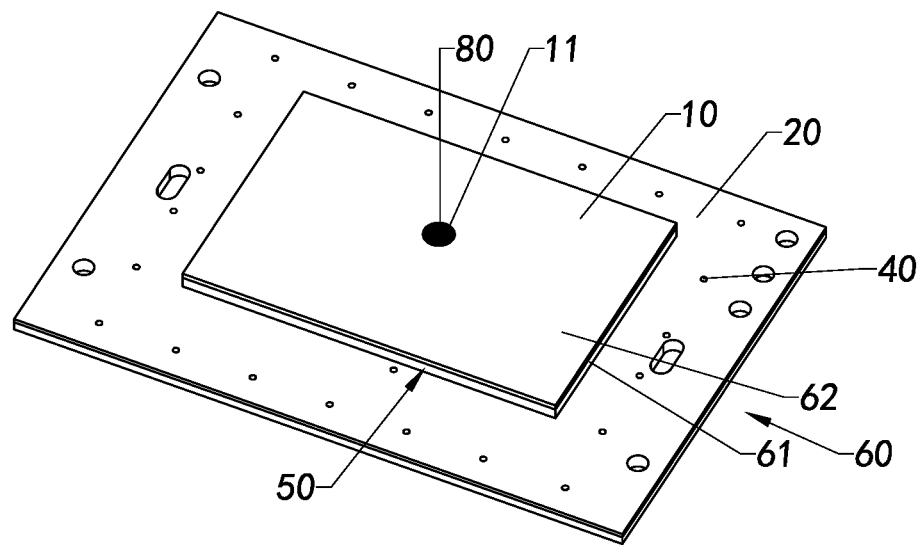
FIGS. 3A and 3B are perspective views illustrating the microwave detector according to the above preferred embodiment of the present invention when a shield member is removed therefrom.
Figure 3B:
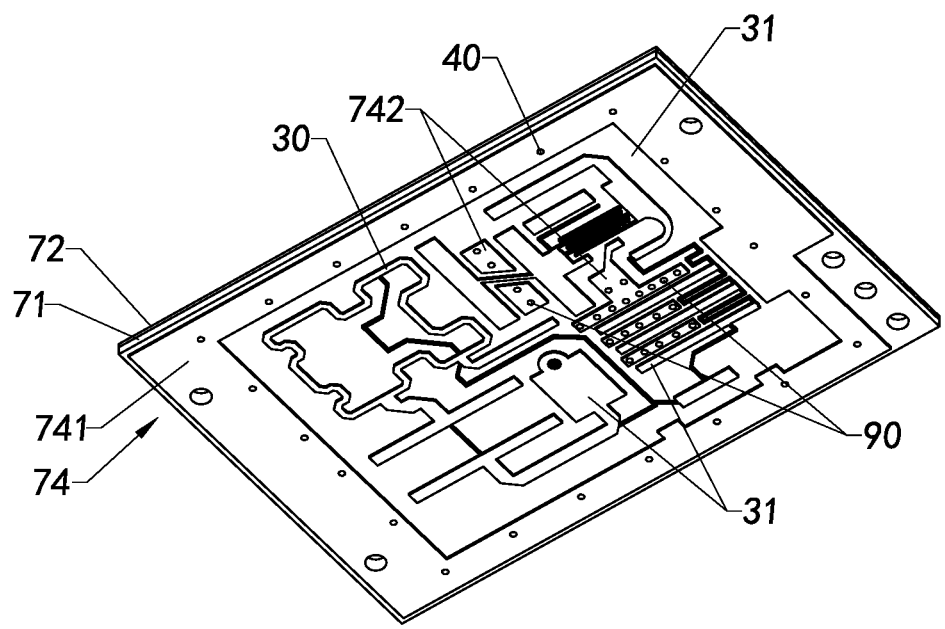
Figure 4:
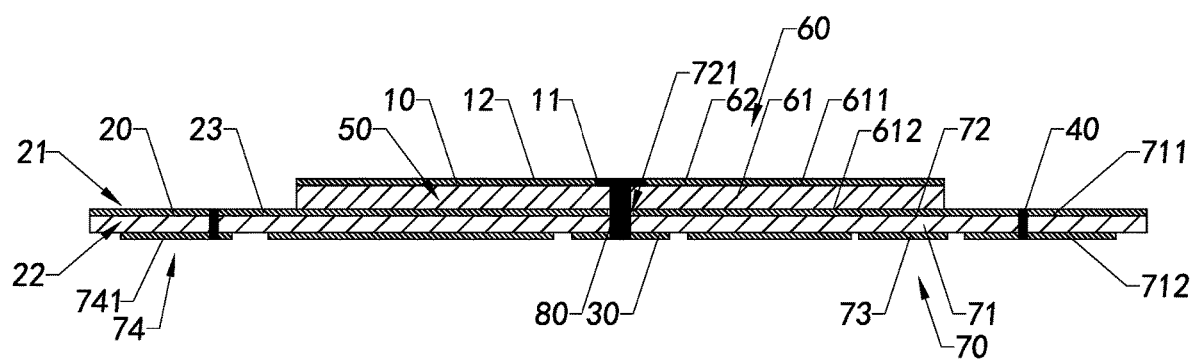
FIG. 4 is a sectional view illustrating the microwave detector according to the above preferred embodiment of the present invention when the shield member is removed therefrom.

Referring to FIG. 3B, the driving circuit 30 is formed by means of etching, but not limited to, on the middle portion of the third metal layer 73, that is attached on the lower surface 712 of the lower base layer 71. The etched third metal layer 73 forms an etched layer 74 which includes a peripheral portion 741 surrounding around the driving circuit 30. In other words, the microwave detector of the present invention further comprises the etched layer 74 including the peripheral portion 741, wherein the peripheral portion 741 is arranged to be surrounding around the driving circuit 30 so as to be layered on the lower surface 712 of the lower base layer 71.

Preferably, the driving circuit 30 comprises at least two interconnected circuit modules 31. Each of the circuit modules 31 can be, but not limited to, oscillation circuit module, frequency mixing circuit module, wave detection circuit module, amplifying circuit module, and etc. The etched layer 74 further includes at least a partition portion 742, which is formed and provided between two adjacent circuit modules 31 of the driving circuit 30, so as to separate and divide the two adjacent circuit modules 31 of the driving circuit 30. For example, for the microwave detector according to the preferred embodiment of the present invention, by etching the middle portion of the third metal layer 73 attached on the lower surface 712 of the lower base layer 71, the driving circuit 30, the peripheral portion 741 surrounding around the driving circuit 30, and the partition portion 742 dividing and separating two adjacent circuit modules 31 of the driving circuit 30 are formed and provided.

The mounting side 612 of the upper base layer 61 of the upper plate component 60 is attached and mounted on the second metal layer 72. The driving circuit 30 is electrically connected with the first metal layer 62, such that the first metal layer 62 forms the radiation source 10, the second metal layer 72 forms the reference ground 20, the upper base layer 61 forms the radiating clearance 50, and the connecting site of the first metal layer 62 and the driving circuit 30 forms the feed point 11 of the radiation source 10.

In the microwave detector of the present invention, after the mounting side 612 of the upper base layer 61 of the upper plate component 60 is attached on the second metal layer 72, the driving circuit 30 and the first metal layer 62 can be communicatively connected by, for example, VIA technology and metallization through-VIA technology. Specifically, the microwave detector further comprises an electrical connection element 80, formed and constructed by, for example, VIA technology and metallization through-VIA technology, which penetrates the upper plate component 60 and the lower plate component 70 and is electrically connected with the feed point 11 of the radiation source 10 and the driving circuit 30, such that the feed point 11 of the radiation source 10 is electrically and conductively connected with the driving circuit 30 through the electrical connection element 80.

In the microwave detector of the present invention, the reference ground 20 is formed by the second metal layer 72 attached on the upper surface 711 of the lower base layer 71 and the driving circuit 30 is formed by the third metal layer 73 attached on the lower surface 712 of the lower base layer 71 after etching, such that the lower base layer 71 divides and separates the reference ground 20 and the driving circuit 30, so as to provide a spacing distance between the reference ground 20 and the driving circuit 30.

According to the microwave detector as illustrated in FIGS. 1-4, a thickness of the lower base layer 71 is equal to or larger than $1/128\ \lambda$, wherein $\lambda$ is a wavelength of the radiated wave of the microwave detector, so that the spacing distance between the reference ground 20 and the driving circuit 30 is equal to or larger than $1/128\ \lambda$. A set of the suppression fence posts 40 surrounds the driving circuit 30 in such a manner that the suppression fence posts 40 are respectively and spacingly and intervally arranged around the side portions of the driving circuit 30, so that the set of the suppression fence posts 40 can suppress the stray electromagnetic radiation generated by the driving circuit 30 effectively when the driving circuit 30 provides microwave excitation electrical signal from the feed point 11 of the radiation source 10 to the radiation source 10 to allow the radiation source 10 and the reference ground 20 to coordinate to generate radiated wave for the microwave detector.

In the microwave detector as illustrated in FIGS. 1-4, the thickness of the lower base layer 71 is equal to the spacing distance between the reference ground 20 and the driving circuit 30. Alternatively, the thickness of the lower base layer 71 is greater than the spacing distance between the reference ground 20 and the driving circuit 30.

Preferably, each of the suppression fence posts 40 of the set of suppression fence posts 40 is extended from the peripheral portion 741 of the etched layer 74 to the direction of the reference ground 20, such that the set of the suppression fence posts 40 surrounds the driving circuit 30 in such a manner that the suppression fence posts 40 of the set of the suppression fence posts 40 are spacingly and intervally arranged around the side portions of the driving circuit 30, so that the set of the suppression fence posts 40 can prevent the electromagnetic wave generated by the driving circuit 30 from radiating to the outside of the peripheral portion 741 in order to suppressing the stray electromagnetic radiation generated by the driving circuit 30. Preferably, the distance of every two adjacent suppression fence posts 40 of the set of suppression fence posts 40 is equal to or less than $1/16 \lambda$. More preferably, the distance of two adjacent suppression fence posts 40 of the set of suppression fence posts 40 is equal to or less than $1/128 \lambda$, so as to prevent stray electromagnetic radiation generated by the driving circuit 30 from radiating to the outside of the peripheral portion 741 and suppress the stray electromagnetic radiation generated by the driving circuit 30.

According to the microwave detector of this preferred embodiment, as illustrated in FIGS. 1-4, each of the suppression fence posts 40 of the set of suppression fence posts 40 is respectively from the peripheral portion 741 of the etched layer 74 to the reference ground 20. For example, the set of suppression fence posts 40 is formed and constructed by utilizing, but not limited to, VIA technology or metallization through-VIA technology on the lower plate component 70, extended from the peripheral portion 741 of the etched layer 74 to the reference ground 20. According to another embodiment of the present invention, a spacing distance is provided between at least one of the suppression fence posts 40 of the set of suppression fence posts 40 and the reference ground 20. Besides, the spacing distance between the suppression fence posts 40 and the reference ground 20 is smaller than or equal to $1/128\lambda$.

Referring to FIGS. 1-4, the microwave detector further comprises at least a row of suppression dams 90, wherein each of the suppression dams 90 of the row of suppression dams is extended from the partition portion 742 of the etched layer 74 toward the direction of the reference ground 20 in such a manner that the suppression dams 90 are spacingly and intervally arranged with each other, such that the row of suppression dams 90 divides and separates two adjacent circuit modules 31 of the driving circuit 30 in order to reduce and weaken the electromagnetic wave produced by the driving circuit 30. For example, one row of the suppression dams 90 can divide and separate an oscillation circuit module from a frequency mixing circuit module, one row of suppression dams 90 can divide and separate an oscillation circuit module from a wave detection circuit module of the driving circuit 30, one row of suppression dams 90 can divide and separate an oscillation circuit module from an amplifying circuit module of the driving circuit 30, one row of suppression dams 90 can divide and separate a frequency mixing circuit module from a wave detection circuit module of the driving circuit 30, one row of suppression dams 90 can divide and separate a frequency mixing circuit module from an amplifying circuit module of the driving circuit 30, and one row of suppression dams 90 can divide and separate a wave detection circuit module from an amplifying circuit module of the driving circuit 30.

According to the microwave detector of this preferred embodiment, as illustrated in FIGS. 1-4, each of the suppression dams 90 of the set of suppression dams 90 is extended from the partition portion 742 of the etched layer 74 to the reference ground 20. For example, the row of suppression dams 90 is formed and constructed by utilizing, but not limited to, VIA technology or metallization through-VIA technology on the lower plate component 70, extended from the partition portion 742 of the etched layer 74 to the reference ground 20. According to another embodiment of the present invention, a spacing distance is provided between at least one of the suppression dams 90 of the row of suppression dams 90 and the reference ground 20. Besides, the spacing distance between the suppression dam 90 and the reference ground 20 is smaller than or equal to $1/128\lambda$.

Preferably, a set of the suppression fence posts 40 and a row of the suppression dams 90 can both be formed on the lower plate component 70 through, for example, the VIA technology or metallization through-VIA technology.

Referring to FIGS. 1-4, the microwave detector further comprises a shield member 100 having a shielded space 101 therein. The shield member 100 is configured and arranged to cover the driving circuit 30, so as to retain the driving circuit 30 in the shielded space 101 of the shield member 100, such that the shield member 100 suppresses the stray electromagnetic radiation generated by the driving circuit 30 through blocking the stray electromagnetic radiation generated by the driving circuit 30 from radiating outside of the shield member 100.

Specifically, the shield member 100 is arranged on the etched layer 74 of the lower plate component 70, wherein a shield wall 102 of the shield member 100 adapted for forming and defining the shielded space 101 inside the shield member 100 is provided corresponding to the set of the suppression fence posts 40. In this way, the shielded space 101 can be further defined by the suppression fence posts 40 and the reference ground 20 and the set of the suppression fence posts 40 and the shield member 100 can coordinate to avoid the stray electromagnetic radiation generated by the driving circuit 30 from radiating to the outside of the shield member 100 and to suppress the stray electromagnetic radiation generated by the driving circuit 30.

In particular, according to one embodiment of the present invention, the shielded space 101 provides a wave absorption material arranged therein, which absorbs stray electromagnetic radiation in order to deplete and reduce the interference to the corresponding driving circuit 30 rendered by the secondary reflection of the stray electromagnetic radiation generated by the driving circuit 30 within the shielded space 101. The wave absorption material may be, for example, but not limited to, high magnetic loss type wave absorption material, high dielectric loss type wave absorption material, and high resistive loss type wave absorption material.

FIGS. 5A-5G illustrates a manufacturing process of the microwave detector.

Figure 5A:
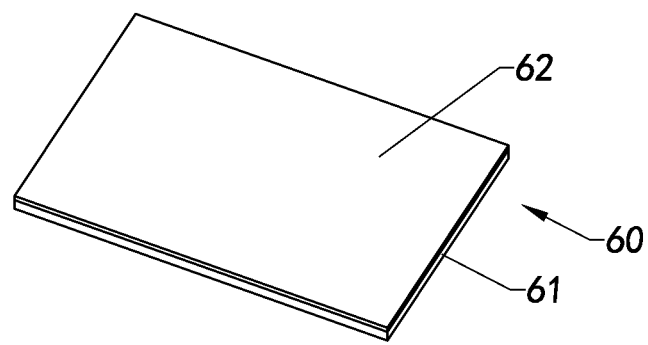
FIG. 5A illustrates the first step of manufacturing the microwave detector according to the above preferred embodiment of the present invention.

Referring to FIG. 5A as well as the perspective views of the microwave detector as illustrated in FIGS. 1-4, the upper plate component 60 is provided. The upper plate component 60 comprises the upper base layer 61 and the first metal layer 62 attached on the attaching side 611 of the upper base layer 61.

Specifically, in the manufacturing process of the microwave detector according to one embodiment of the present invention, firstly a base plate is provided, and then a metal plate is attached on the surface of the base plate in order to form a panel unit. Next, the panel unit is cut and shaped to form the upper plate component 60. The cut and shaped base plate forms the upper base layer 61 of the upper plate component 60 and the cut and shaped metal plate forms the first metal layer 62 of the upper plate component 60.

According to an alternative mode of the manufacturing processes of the microwave detector of the present invention, firstly the upper base layer 61 and the first metal layer 62 are provided. Then, the first metal layer 62 is attached on the attaching side 611 of the upper base layer 61 to form the upper plate component 60.

It is worth mentioning that the way to attach the metal plate on the surface of the base plate in order to allow the metal plate and the base plate to be laminated to form a panel unit shall not be limited in the microwave detector of the present invention. For example, an adhesive such as glue is applied between the metal layer and the base plate to attach the metal plate onto the surface of the base plate, so as to allow the metal plate and the base plate to be laminated to form the panel unit.

Correspondingly, in the alternative mode, the way to attach the first metal layer 62 on the attaching side 611 of the upper base layer 61 shall not be limited for the microwave detector of the present invention too. For example, an adhesive is provided between the attaching side 611 of the upper base layer 61 and the first metal layer 62 so as to attach the first metal layer 62 on the attaching side 611 of the upper base layer 61 to form the upper plate component 60.

Figure 5B:
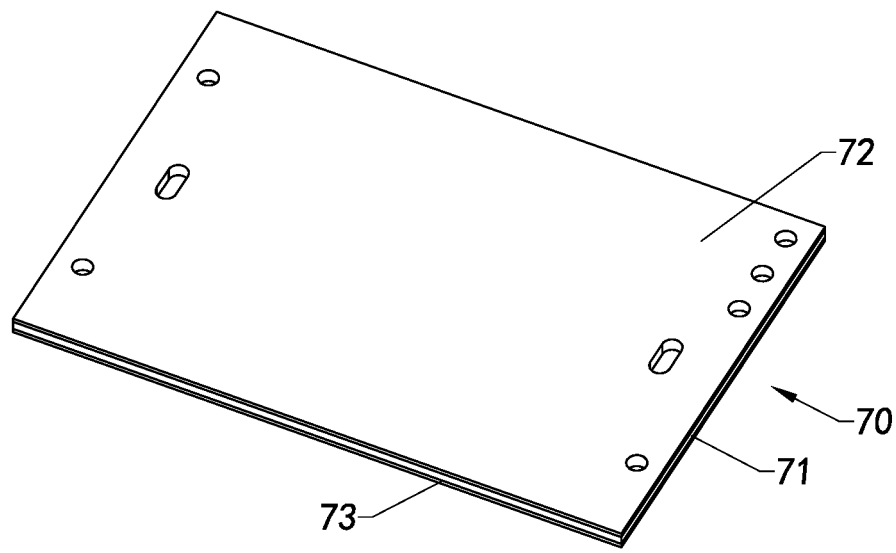
FIG. 5B illustrates the second step of manufacturing the microwave detector according to the above preferred embodiment of the present invention.

Referring to FIG. 5B, the lower plate component 70 is provided. The lower plate component 70 comprises the lower base layer 71, the second metal layer 72 attached on the upper surface 711 of the lower base layer 71, and the third metal layer 73 attached on the lower surface 712 of the lower base layer 71.

Specifically, in the manufacturing process of the microwave detector according to one embodiment of the present invention, firstly a base plate is provided, and then two metal plates are attached on the two surfaces of the base plate respectively in order to form a panel unit. Next, the panel unit is cut and shaped to form the lower plate component 70. The cut base plate forms the lower base layer 71 of the lower plate component 70, while the cut metal plates respectively form the second metal layer 72 and the third metal layer 73 of the lower plate component 70.

According to an alternative mode of the manufacturing processes of the microwave detector of the present invention, firstly the lower base layer 71 one second metal layer 72 and one third metal layer 73 are provided. Then, the second metal layer 72 is attached on the upper surface 711 of the lower base layer 71 and the third metal layer 73 is attached on the upper surface 712 of the lower base layer 71 to form the lower plate component 70.

It is worth mentioning that the way to attach the metal plate on the surface of the base plate in order to allow the metal plate and the base plate to be laminated to form the panel unit shall not be limited in the microwave detector of the present invention. For example, an adhesive is applied between the metal plate and the base plate to attach the metal plate onto the surface of the base plate, so as to allow the metal layer and the base plate to be laminated to form the panel unit.

Correspondingly, in the alternative mode, the way to attach the second metal layer 72 on the upper surface 711 of the lower base layer 71 and the third metal layer 73 on the upper surface 711 of the lower base layer 71 shall not be limited for microwave detector of the present invention. For example, an adhesive is provided between the second metal layer 72 and the upper surface 711 of the lower base layer 71 as well as between the third metal layer 73 and the lower surface 712 of the lower base layer 71, so as to attach the second metal layer 72 on the upper surface 711 of the lower base layer 71 and attach the third metal layer 73 on the lower surface 712 of the lower base layer 71.

Figure 5C:
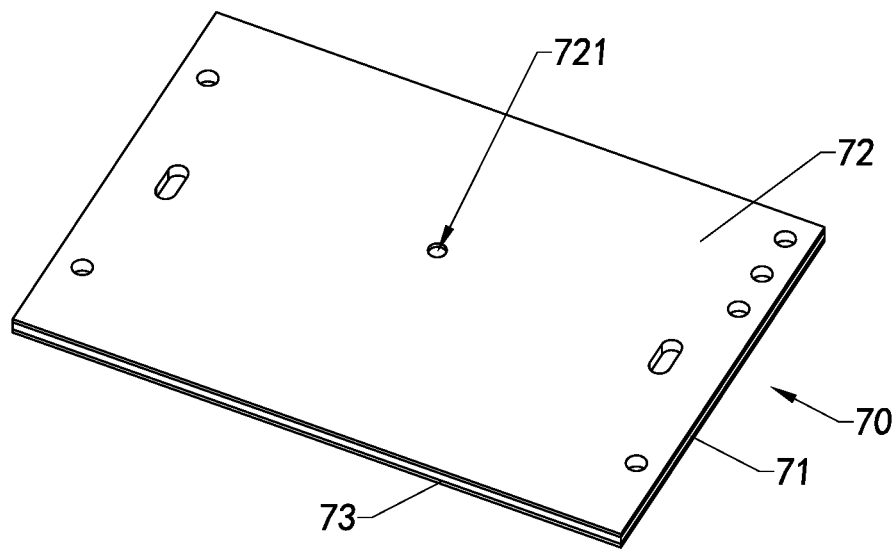
FIG. 5C illustrates the third step of manufacturing the microwave detector according to the above preferred embodiment of the present invention.
Figure 5D:
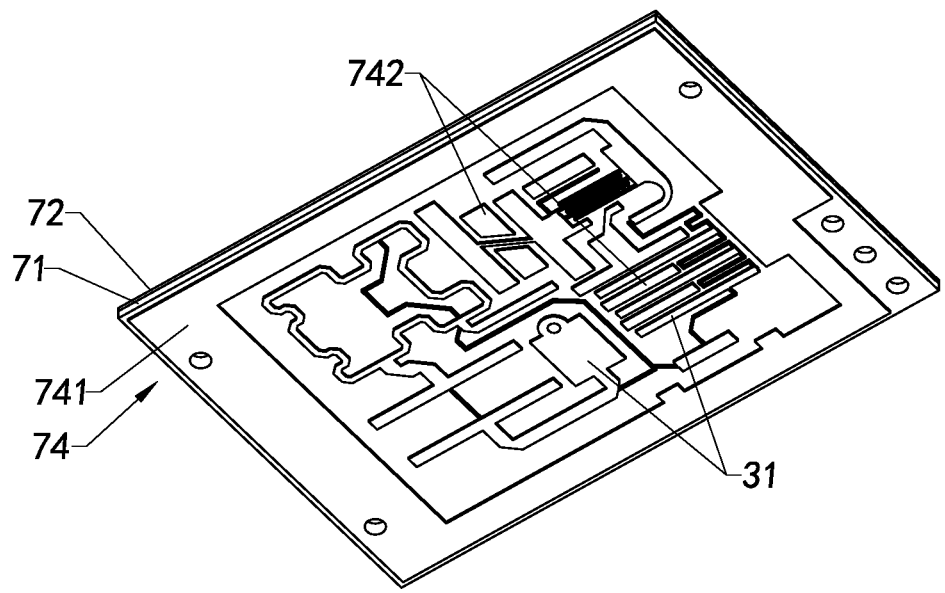
FIG. 5D illustrates the fourth step of manufacturing the microwave detector according to the above preferred embodiment of the present invention.

Referring to FIGS. 5C and 5D, etch a middle portion of the second metal layer 72 to form a notch 721 in the second metal layer 72. And, etch the third metal layer 73 so as to form and construct the driving circuit 30 thereon, a peripheral portion 741 of the etched layer 74 surrounding around the driving circuit 30, and a partition portion 742 of the etched layer 74 dividing and separating the adjacent circuit module 31 of the driving circuit 30.

It is worth mentioning that the order of etching the second metal layer 72 and etching the third metal layer 73 shall not be limited in the manufacturing process of the microwave detector of the present invention. For example, according to one embodiment, the second metal layer 72 is firstly etched and then the third metal layer 73 is etched. Nevertheless, according to another embodiment, the third metal layer 73 is firstly etched and then the second metal layer 72 is etched. Moreover, according to another embodiment, the second metal layer 72 and the third metal layer 73 are etched at the same time.

Figure 5E:
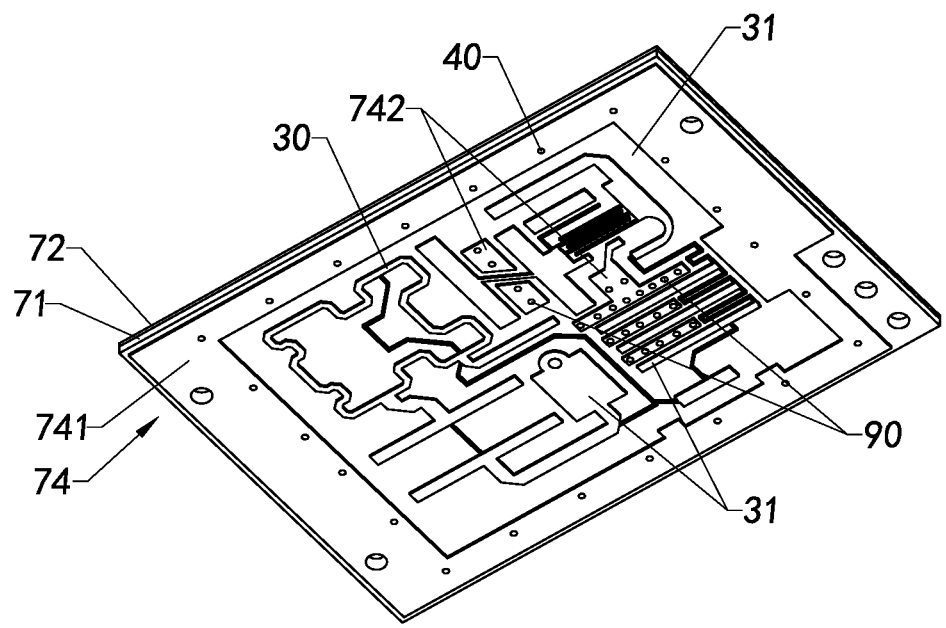
FIG. 5E illustrates the fifth step of manufacturing the microwave detector according to the above preferred embodiment of the present invention.

Referring to FIG. 5E, by means of such as VIA technology or metallization through-VIA technology, at least a set of suppression fence posts 40 and at least a row of suppression dams 90 are formed on the lower plate component 70, wherein the suppression fence posts 40 of the set of suppression fence posts 40 are spacingly and intervally formed and constructed around the side portions of the driving circuit 30 in the manner of extending from the peripheral portion 741 of the etched layer 74 towards the direction of the second metal layer 72, so that the suppression fence posts 40 of the set of suppression fence posts 40 surround around the driving circuit 30. In addition, the suppression dams 90 of the row of suppression dams 90 are spacingly and intervally formed and constructed between the adjacent circuit modules 31 of the driving circuit 30 in the manner of extending from the partition portion 742 of the etched layer 74 towards the direction of the second metal layer 72, so that the suppression dams 90 of the row of suppression dams 90 divide and separate the adjacent circuit modules 31 of the driving circuit 30. Preferably, each of the suppression fence posts 40 of the set of suppression fence posts 40 is extended from the peripheral portion 741 of the etched layer 74 to the second metal layer 72, wherein each of the suppression dams of the row of suppression dams 90 is extended from the partition portion 742 of the etched layer 74 to the second metal layer 72.

It is worth mentioning that the order of forming and constructing the suppression fence posts 40 and the suppression dams 90 shall not be limited in the manufacturing process of the microwave detector of the present invention. For example, according to a preferred embodiment, the suppression fence posts 40 are firstly formed and constructed and then the suppression dams 90 are formed and constructed. Nevertheless, according to an alternative mode, the suppression dams 90 are firstly formed and constructed and then the suppression fence posts 40 are formed and constructed. Also, according another alternative mode, the suppression fence posts 40 and the suppression dams 90 are formed and constructed at the same time.

Figure 5F:
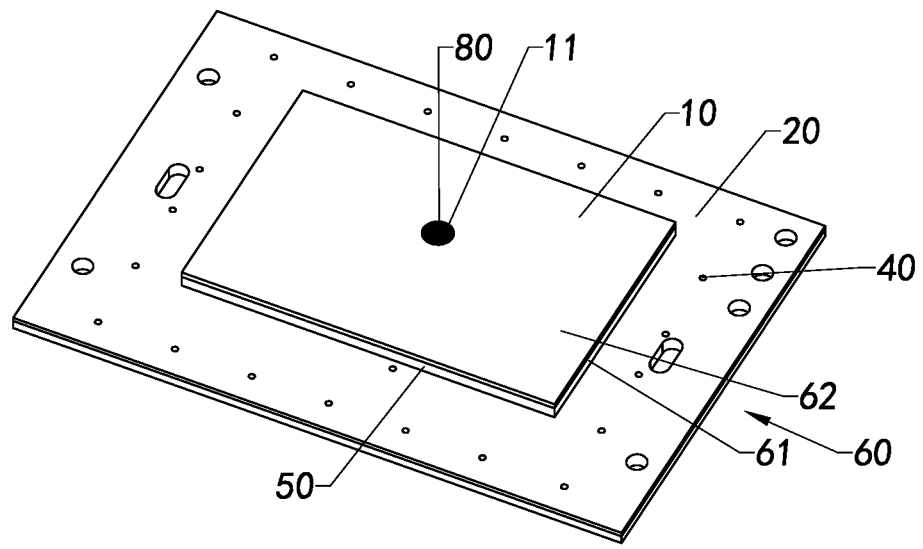
FIG. 5F illustrates the sixth step of manufacturing the microwave detector according to the above preferred embodiment of the present invention.

Referring to FIG. 5F, attach and mount the mounting side 612 of the upper base layer 61 of the upper plate component 60 on the second metal layer 72 of the lower plate component 70, and then the electrical connection element 80, extended from the first metal layer 62 of the upper plate component 60 via the through notch 721 of the second metal layer 72 of the lower plate component 70 to the driving circuit 30, is formed and constructed by, for example, VIA technology and metallization through-VIA technology, such that the first metal layer 62 of the upper plate component 60 forms the radiation source 10, the second metal layer 72 of the lower plate component 70 forms the reference ground 20, and the upper base layer 61 of the upper plate component 60 forms the radiating clearance 50. It should be understandable that, through the formation of the through notch 721 in the second metal layer 72 of the lower plate component 70, the electrical connection element 80 formed can be prevented from communicating with the reference ground 20.

Figure 5G:
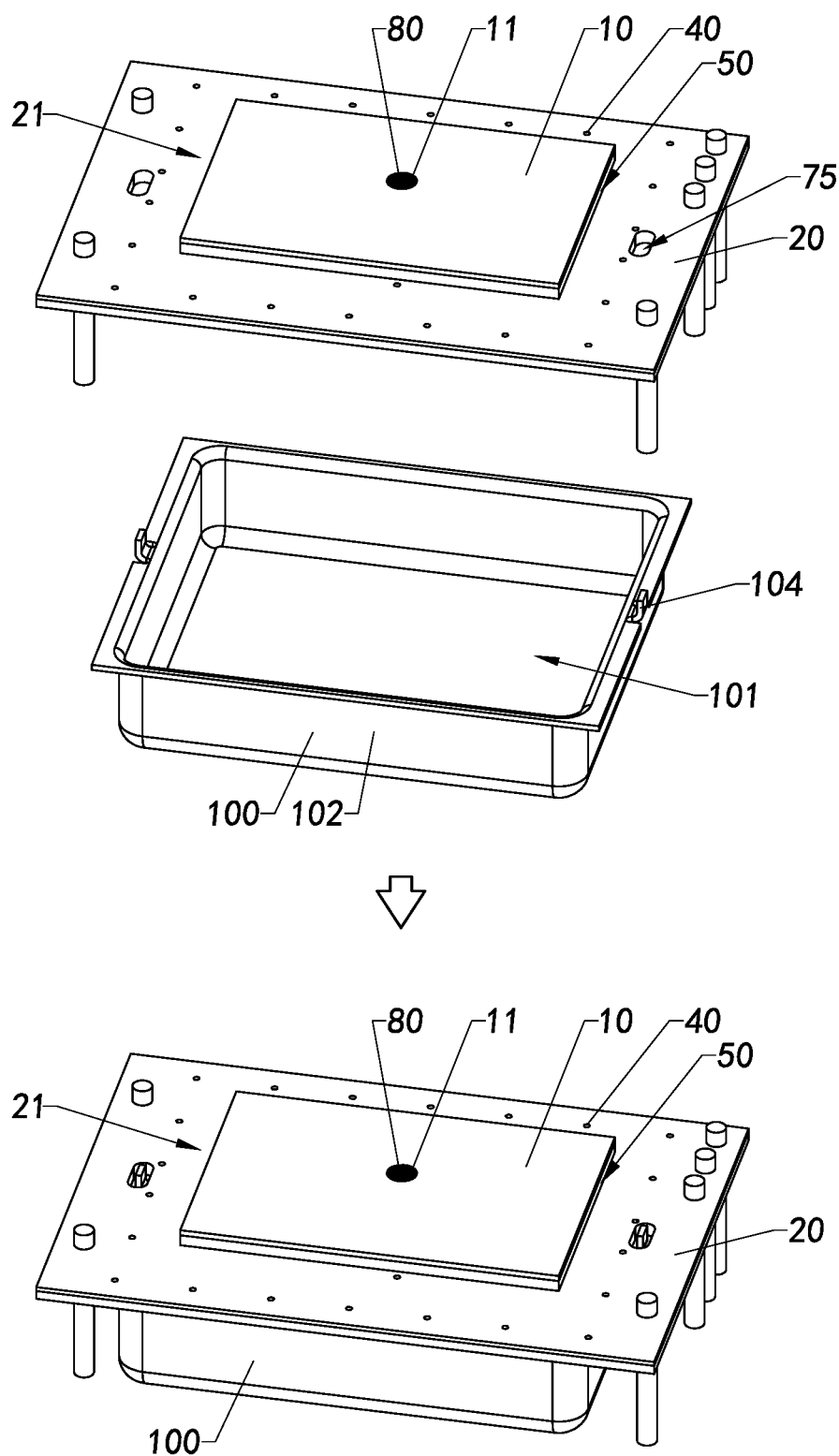
FIG. 5G illustrates the seventh step of manufacturing the microwave detector according to the above preferred embodiment of the present invention.

Referring to FIG. 5G, the shield member 100 is mounted on the lower plate component 70, such that the shield wall 102 of the shield member 100 is arranged corresponding to the set of suppression fence posts 40, so as to keep and retain the driving circuit 30 in the shielded space 101 formed and defined by the shield wall 102 of the shield member 100.

It is worth mentioning that the way of mounting the shield member 100 on the lower plate component 70 shall not be limited for the microwave detector of the present invention. For example, the lower plate component 70 may have one or more mounting holes 75 extended from the peripheral portion 741 of the etched layer 74 to the reference ground 20, and the shield member 100 may comprise one or more mounting arms 104 arranged thereon, such that the one or more mounting arms 104 of the shield member 100 can be respectively mounted in the mounting holes 75 of the lower plate component 70, so as to install the shield member 100 to the lower plate component 70.

In accordance with another aspect of the invention, the present invention further provides a manufacturing method of the microwave detector, comprising the following steps:

(a) Etch the second metal layer 72 that is attached on the upper surface 712 of the lower base layer 71, so as to allow the second metal layer 72 to form the notch 721, and etch the third metal layer 73 that is attached on the lower surface 712 of the lower base layer 72 to allow the third metal layer 73 to form the driving circuit 30.

(b) Form at least a set of the suppression fence posts 40 surrounding around the side portions of the driving circuit 30.

(c) Allow the mounting side 612 of the upper base layer 61, which has the first metal layer 62 attached on the attaching side 611 thereof, to be attached on the second metal layer 72.

(d) Form the electrical connection element 80, extended from the first metal layer 62 to the driving circuit 30 via the through notch 721 of the second metal layer 72, so as to make the microwave detector, wherein the first metal layer 62 forms the radiation source 10 of the microwave detector, the second metal layer 72 forms the reference ground 20 of the microwave detector, and the upper base layer 61 forms the radiating clearance 50 of the microwave detector.

Figure 7:
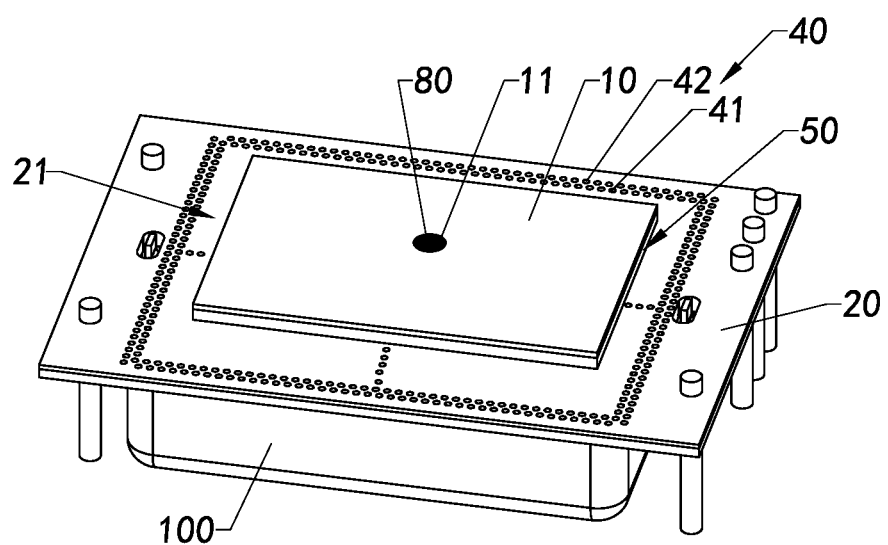
FIG. 7 is a perspective view of the microwave detector according to a second alternative mode of the above preferred embodiment of the present invention.
Figure 8:
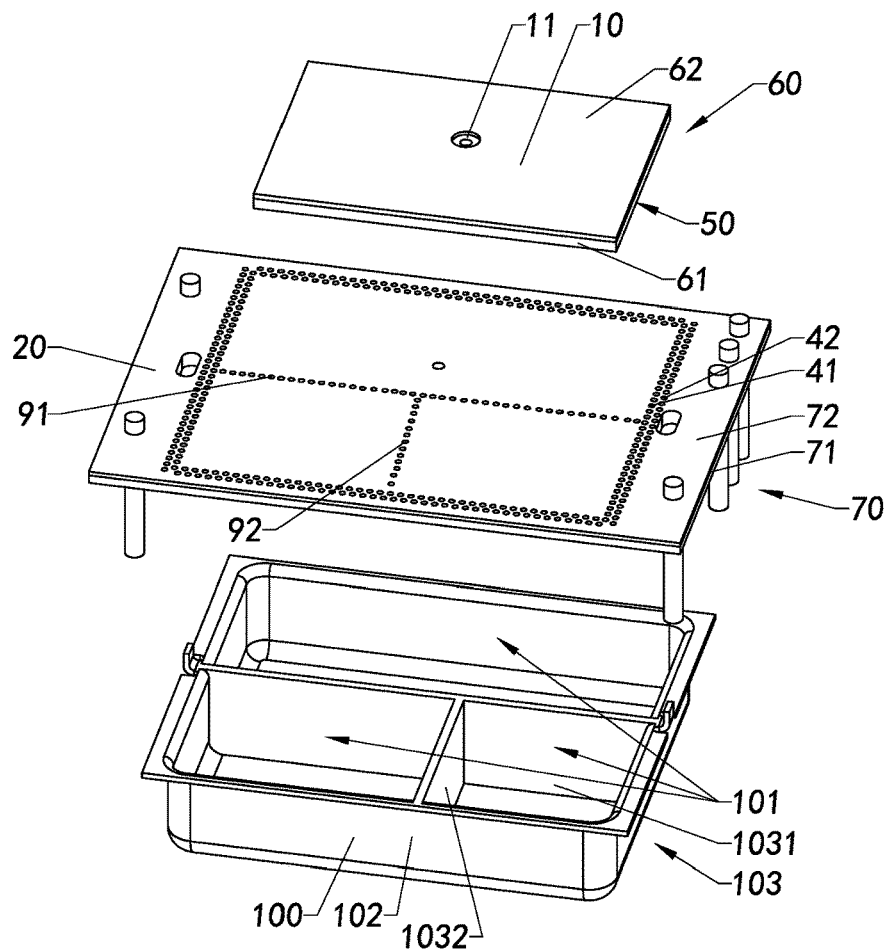
FIG. 8 is an exploded view of the microwave detector according to the second alternative mode of the above preferred embodiment of the present invention.
Figure 9:
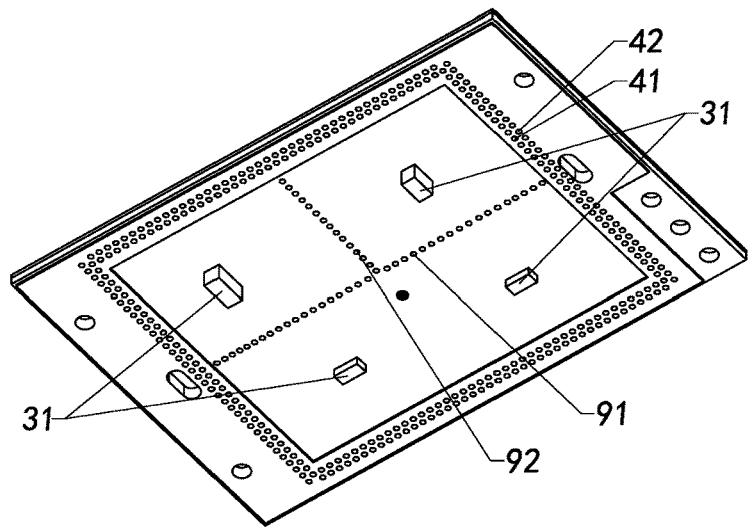
FIG. 9 is a perspective view illustrating the microwave detector according to the second alternative mode of the above preferred embodiment of the present invention when the shield member is removed therefrom.

In contrasting to the microwave detector as illustrated in FIGS. 1-4, the microwave detector according to a second alternative mode as illustrated in FIGS. 7-9 is different in that the microwave detector comprises two sets of suppression fence posts 40, wherein both sets of suppression fence posts 40 are arranged surrounding the driving circuit 30, wherein one of the sets of suppression fence posts 40 is arranged in in inner position forming a set of inner suppression fence posts 41, while correspondingly, the other set of suppression fence posts 40 is arranged in the outer position forming a set of outer suppression fence posts 42, wherein the inner suppression fence posts 41 surround the driving circuit 30 in such a manner that the inner suppression fence posts 41 are spacingly and intervally arranged along the side portions of the driving circuit 30, and the outer suppression fence posts 42 surround the driving circuit 30 in such a manner that the outer suppression fence posts 42 are spacingly and intervally arranged along the side portions of the driving circuit 30. Preferably, each of the inner suppression fence posts 41 of the set of inner suppression fence posts 41 and each of the outer suppression fence posts 42 of the set of outer suppression fence posts 42 are alternately arranged and positioned. For example, any one of the inner suppression fence posts 41 is formed corresponding to the space formed and defined between two adjacent outer suppression fence posts 42, while any one of the outer suppression fence posts 42 is also formed corresponding to the space formed and defined between the two adjacent inner suppression fence posts 41. Alternatively, the inner suppression fence posts 41 and the outer suppression fence posts 42 are positioned corresponding with each other.

Referring to FIGS. 7-9, according to the second alternative mode of the above preferred embodiment of the present invention, the driving circuit 30 is embodied to comprise three circuit modules 31, namely a frequency mixing wave detection circuit module, an oscillation circuit module and a low frequency amplifying circuit module. Correspondingly, the microwave detector comprises two rows of suppression dams, including one row of first suppression dams 91 and another row of second suppression dams 92. The row of first suppression dams 91 is extended from an end of the peripheral portion 741 to the other end thereof in such a manner that the first suppression dams 91 are separated and spaced with one another, such that the low frequency amplifying circuit module is retained in one side of the row of first suppression dams 91, while the frequency mixing wave detection circuit module and the oscillation circuit module are retained at the other side of the row of first suppression dams 91, wherein the row of second suppression dams 92 is extended from a side of the peripheral portion 741 to the first suppression dams 91 in such a manner that the second suppression dams 92 are separated and spaced from one another, such that the frequency mixing wave detection circuit module is retained in one side of the row of second suppression dams 92, while the oscillation circuit module is retained in the other side of the row of second suppression dams 92. In other words, the row of first suppression dams 91 is arranged for dividing and separating adjacent circuit modules 31 of the driving circuit 30, and that the row of second suppression dams 92 is arranged for dividing and separating adjacent circuit modules 31 of the driving circuit 30 too.

Preferably, referring to FIGS. 8 and 9, each of the first suppression dams 91 of the row of first suppression dams 91 and each of the second suppression dams 92 of the row of second suppression dams 92 are extended from the lower base layer 71 to the reference ground 20.

Please referring to FIGS. 7-9, according to the second alternative mode of the above preferred embodiment of the present invention, the shield member 100 is embodied to comprise the shield wall 102 and two division members 103, namely a first division member 1031 and a second division member 1032. The space formed and defined in the shield wall 102 by the first division member 1031 is extended from an end of the shield wall 102 to another end thereof. The space formed and defined in the shield wall 102 by the second division member 1032 is extended from a side of the shield wall 102 to the first division member 1031, so as to utilize the shield wall 102, the first division member 1031 and the second division member 1032 to form and define three adjacent and independent shielded spaces 101.

The shield member 100 is mounted on the lower plate component 70. The shield wall 102 of the shield member 100 is arranged corresponding to the set of suppression fence posts 40. The first division member 1031 of the shield member 100 is arranged corresponding to one row of the first suppression dams 91. The second division member 1032 of the shield member 100 is arranged corresponding to one row of the second suppression dams 92. Thereby, the low frequency amplifying circuit module of the driving circuit 30 is positioned corresponding to the shielded space 101 formed and defined by the shield wall 102 and the first division member 1031; the frequency mixing wave detection circuit module of the driving circuit 30 is positioned corresponding to the shielded space 101 formed and defined by the shield wall 102, the first division member 1031 and the second division member 1032; the oscillation circuit module of the driving circuit 30 is positioned corresponding to the shielded space 101 formed and defined by the shield wall 102, the first division member 1031 and the second division member 1032, such that the shield member 100 can divide and isolate the adjacent circuit modules 31 of the driving circuit 30 so as to suppress the stray electromagnetic radiation generated by the driving circuit 30 as well as to reduce the interference to the adjacent circuit modules 31 rendered by the stray electromagnetic radiation generated by the driving circuit 30.

Preferably, the shield member 100 has an integral structure. That is the shield wall 102, the first division member 1031 and the second division member 1032 of the shield member 100 can be integrally formed.

Figure 10:
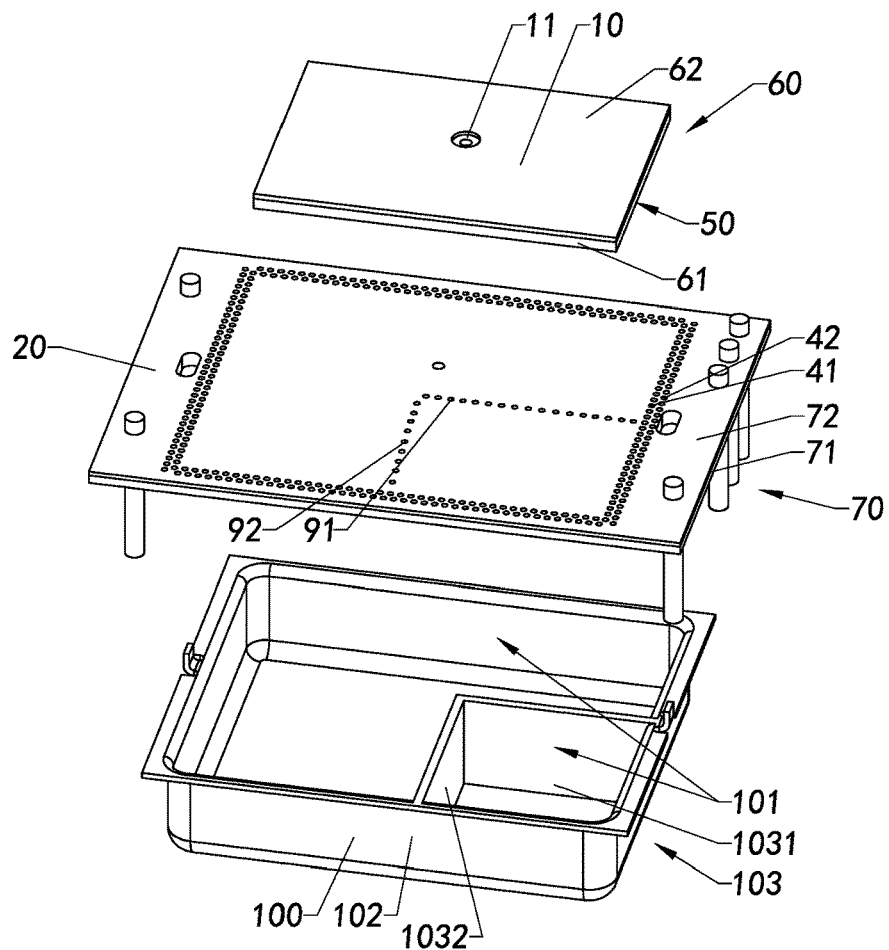
FIG. 10 is an exploded view of the microwave detector according to a third alternative mode of the above preferred embodiment of the present invention.
Figure 11:
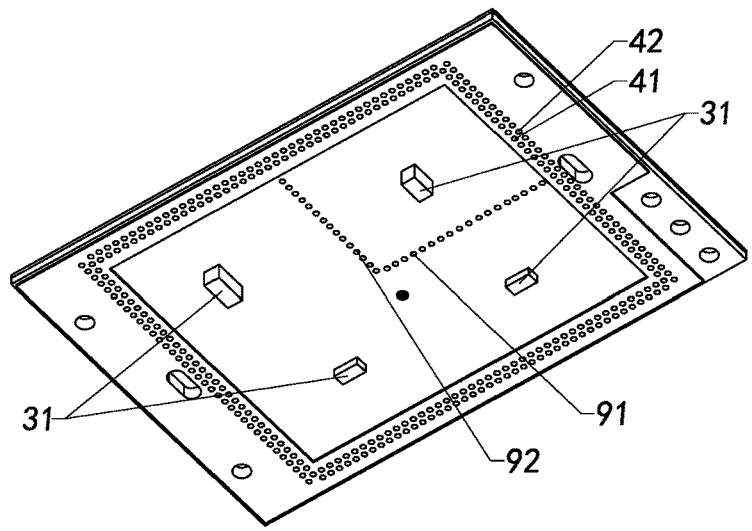
FIG. 11 is a perspective view illustrating the microwave detector according to the third alternative mode of the above preferred embodiment of the present invention when the shield member is removed therefrom.

In contrasting to the microwave detector as illustrated in FIGS. 7-9, the microwave detector according to a third alternative mode as illustrated in FIGS. 10-11 is different in that the driving circuit 30 is embodied to comprise two circuit modules 31, namely an oscillation circuit module and a frequency mixing wave detection amplifying circuit module, wherein one row of the first suppression dams 91 is extended from an end of the peripheral portion 741 towards the direction of another end thereof, while one row of the second suppression dams 92 is extended from a side of the peripheral portion 741 towards the direction of another side thereof, wherein the row of first suppression dams 91 is arranged with respect to the row of second suppression dams 92, such that the row of first suppression dams 91 and the row of second suppression dams 92 are arranged to divide and isolate the oscillation circuit module and the frequency mixing wave detection amplifying circuit module of the driving circuit 30.

The space formed and defined within the shield wall 102 by the first division member 1031 of the shield member 100 is extended from an end of the shield wall 102 towards the direction of another end of the shield wall 102. The space formed and defined within the shield wall 102 by the second division member 1032 is extended from a side of the shield wall 102 towards the direction of another side of the shield wall 102. Besides, the first division member 1031 and the second division member 1032 are connected with each other, so as to utilize the shield wall 102, the first division member 1031 and the second division member 1032 to form and define two adjacent and independent shielded spaces 101.

The shield member 100 is mounted on the lower plate component 70. The shield wall 102 of the shield member 100 is arranged corresponding to one set of the suppression fence posts 40. The first division member 1031 of the shield member 100 is arranged corresponding to one row of the first suppression dams 91. The second division member 1032 of the shield member 100 is formed corresponding to one row of the second suppression dams 92. Thereby, the oscillation circuit module of the driving circuit 30 is retained in the corresponding shielded space 101 formed and defined by the shield wall 102, the first division member 1031 and the second division member 1032, and the frequency mixing wave detection amplifying circuit module of the driving circuit 30 is retained in the corresponding shielded space 101 formed and defined by the shield wall 102, the first division member 1031 and the second division member 1032. Accordingly, the shield member 100 substantially divides and isolates the adjacent circuit modules 31 of the driving circuit 30, so as to suppress the stray electromagnetic radiation generated by the driving circuit 30 as well as to reduce the interference to adjacent circuit modules 31 rendered by the stray electromagnetic radiation generated by the driving circuit 30.

In particular, according to some embodiments of the present invention, at least one of the shielded spaces 101 comprises a wave absorption material arranged therein, which absorbs stray electromagnetic radiation in order to deplete and reduce the interference to the corresponding driving circuit 30 and/or adjacent circuit module(s) 31 by the secondary reflection of the stray electromagnetic radiation generated by the driving circuit 30 in the shielded space 101. The wave absorption material may be, for example but not limited to, high magnetic loss type wave absorption material, high dielectric loss type wave absorption material, and high resistive loss type wave absorption material.

Figure 12:
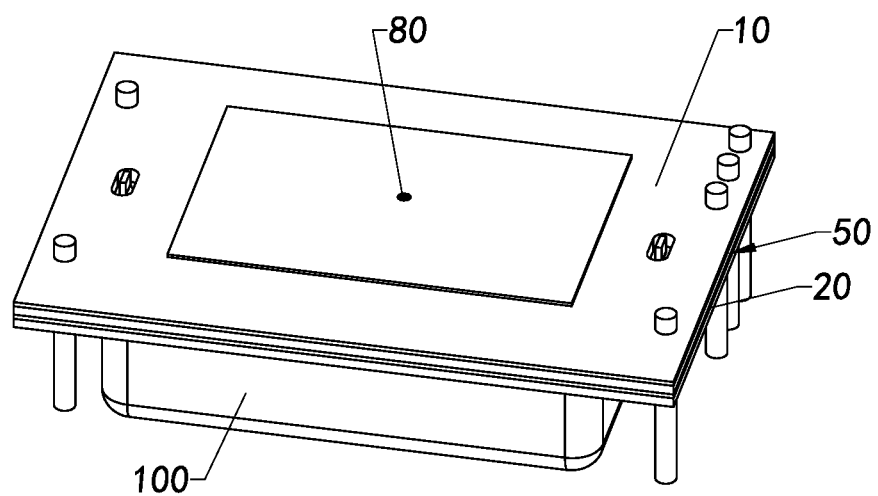
FIG. 12 is a perspective view of the microwave detector according to the third alternative mode of the above preferred embodiment of the present invention.
Figure 13:
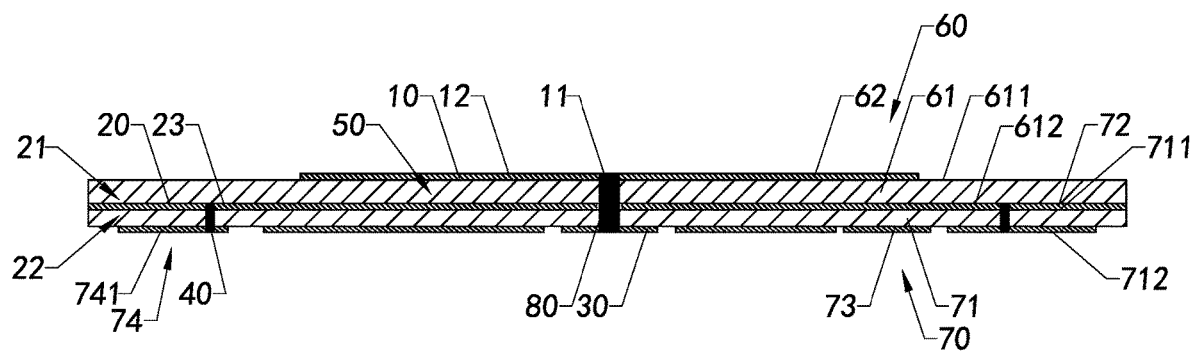
FIG. 13 is a sectional view illustrating the microwave detector according to the third alternative mode of the above preferred embodiment of the present invention when the shield member is removed therefrom.
Figure 14:
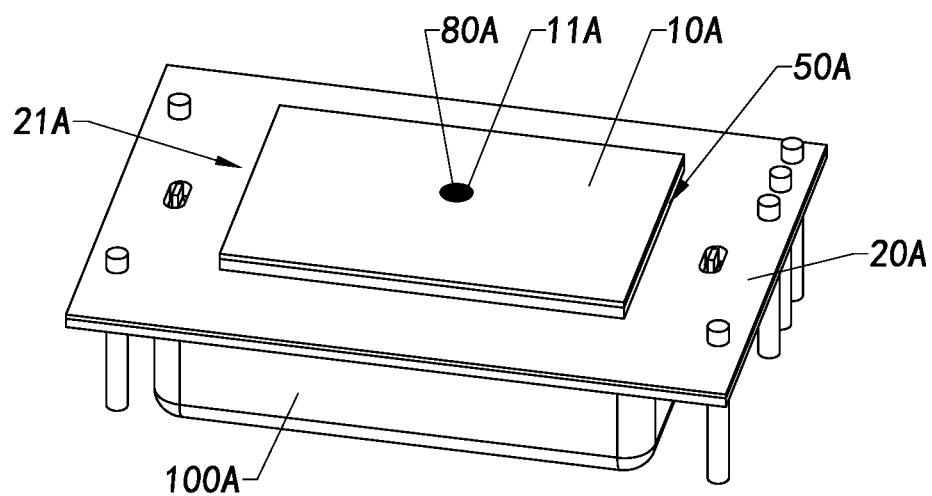
FIG. 14 is a perspective view of a microwave detector according to a fourth alternative mode of the above preferred embodiment of the present invention.
Figure 15:
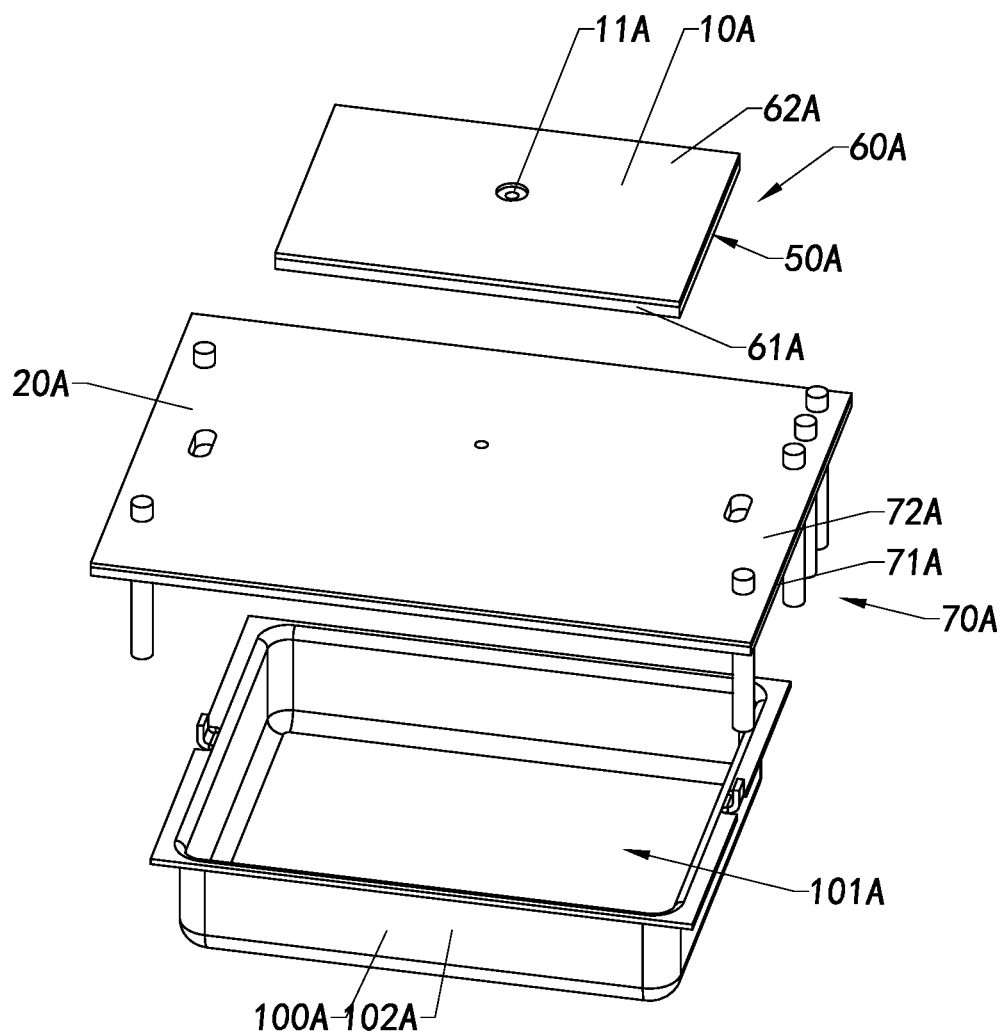
FIG. 15 is an exploded view of the microwave detector according to the fourth alternative mode of the above preferred embodiment of the present invention.

In contrasting to the microwave detector as illustrated in FIGS. 1-4, the microwave detector according to a fourth alternative mode of the above preferred embodiment of the present invention as illustrated in FIGS. 12-13 is different in that the upper base layer 61 of the upper plate component 60 is layered on the second metal layer 72 of the lower plate component 70, so as to prevent the reference ground 20 formed by the second metal layer 72 of the lower plate component 70 from exposure. In other words, for the microwave detector as illustrated in FIGS. 12-13, the suppression fence posts 40 are invisible from the exterior and outside.

The manufacturing process of the microwave detector according to the fourth alternative mode of the above preferred embodiment of the present invention as illustrated in FIGS. 12-13 is different from the manufacturing process of the microwave detector as illustrated in FIGS. 1-4 in that a base plate is firstly provided, and then a metal layer is attached on the surface of the base plate in order to form a panel unit. Next, the panel unit is cut, and then the metal layer is etched in order to form the upper plate component 60. The cut base plate forms the upper base layer 61 of the upper plate component 60 and the cut and etched metal layer forms the first metal layer 62 of the upper plate component 60.

In accordance with another aspect of the invention, the present invention further provides a stray electromagnetic radiation suppression method for microwave detector, comprising the following steps:

(A) Arrange at least one set of suppression fence posts 40 around the driving circuit 30 of the microwave detector along the side portions of the driving circuit 30.

(B) Prevent the electromagnetic wave produced by the driving circuit 30 from radiating to the direction of the side portions of the driving circuit 30 by means of the at least one set of the suppression fence posts 40 when a microwave excitation electrical signal is provided from the feed point 11 of the radiation source 10 of the microwave detector to the radiation source 10 by the driving circuit 30, so as to suppress the stray electromagnetic radiation generated by the driving circuit 30.

Further, the stray electromagnetic radiation suppression method further comprises the following step:

(C) Divide and isolate the adjacent circuit modules 31 of the driving circuit 30 so as to weaken the stray electromagnetic radiation generated by the driving circuit 30.

Specifically, according to a preferred embodiment of the present invention, in the step (C) of the stray electromagnetic radiation suppression method, at least a row of the suppression dams 90 is formed between the adjacent circuit modules 31 of the driving circuit 30, such that the row of suppression dams 90 divides and isolates the adjacent circuit modules 31 of the driving circuit 30 in order to suppress the stray electromagnetic radiation generated by the driving circuit 30 and to reduce the interference to the adjacent circuit module 31 rendered by the stray electromagnetic radiation generated by the driving circuit 30.

According to another preferred embodiment of the present invention, in the step (C) of the stray electromagnetic radiation suppression method, the circuit modules 31 of the driving circuit 30 are respectively retained in independent shielded spaces 101 of the shield member 100, so as to utilize the shield member 100 to divide and isolate the adjacent circuit modules 31 of the driving circuit 30 in order to suppress the stray electromagnetic radiation generated by the driving circuit 30 and to reduce the interference to the adjacent circuit module 31 rendered by the stray electromagnetic radiation generated by the driving circuit 30.

Referring to FIGS. 14-17 of the present invention, a microwave detector according to a fifth alternative mode of the above preferred embodiment of the present invention is disclosed and illustrated in the following description, wherein the microwave detector comprises a radiation source 10A, a reference ground 20A and a driving circuit 30A.

More specifically, the reference ground 20A has a first side 21A and a second side 22A with respect to the first side 21A. The radiation source 10A is retained on the first side 21A of the reference ground 20A. The radiation source 10A and the reference ground 20A are separated and spaced to form a radiating gap 50A of the microwave detector between the radiation source 10A and the reference ground 20A. The driving circuit 30A is retained on the second side 22A of the reference ground 20A. The driving circuit 30A is electrically connected with a feed point 11A of the radiation source 10A. A spacing distance between the reference ground 20A and the driving circuit 30A is smaller than $1/128\lambda$, wherein $\lambda$ is the wavelength of the radiated wave of the microwave detector. When the driving circuit 30A provides microwave excitation electrical signal from the feed point 11A of the radiation source 10A to the radiation source 10A, the radiation source 10A and the reference ground 20A coordinate with each other to allow the microwave detector to produce radiated wave. Accordingly, the configuring and arranging of the spacing distance between reference ground 20A and the driving circuit 30A to be smaller than $1/128\lambda$ can suppress the stray electromagnetic radiation generated by the driving circuit 30A.

More specifically, for the microwave detector according to the fifth alternative mode of the above preferred embodiment of the present invention as illustrated in FIGS. 14-17, the radiation source 10A comprises a radiation source plane 12A, wherein the reference ground 20A has a reference ground plane 23A, and the radiation source plane 12A of the radiation source 10A and the reference ground plane 23A of the reference ground 20A are parallel to each other, so as to make the microwave detector having a flat panel shape. In other words, the microwave detector as illustrated in FIGS. 14-17 is a flat panel detector.

It is worth mentioning that the microwave detector as illustrated in FIGS. 14-17 is described as a flat panel detector as an example, but it shall not be considered as limitation of the content and scope of the microwave detector of the present invention. For example, according to other embodiments of the present invention, the microwave detector can be a columnar detector, which means that the extending direction of the radiation source 10A is perpendicular to the reference ground plane 23A of the reference ground 20A.

Referring to FIGS. 14-17, the radiation source 10A has a rectangle shape with four edges therearound, such that the radiation source 10A has a length direction and a width direction. The reference ground 20A also has a rectangle shape with four edges therearound, such that the reference ground 20A has a length direction and a width direction. The length direction of the radiation source 10A and the length direction of the reference ground 20A are parallel. Correspondingly, the width direction of the radiation source 10A and the width direction of the reference ground 20A are parallel. Alternatively, according to an alternative mode of the microwave detector, the length direction of the radiation source 10A and the width direction of the reference ground 20A are configured in parallel direction, and correspondingly, the width direction of the radiation source 10A and the length direction of the reference ground 20A are configured in parallel direction.

Referring to FIGS. 14-17, the microwave detector further comprises an upper plate component 60A and a lower plate component 70A. The upper plate component 60A comprises an upper base layer 61A and a first metal layer 62A. The upper base layer 61A has an attaching side 611A and a mounting side 612A corresponding to the attaching side 611A. The first metal layer 62A is attached on the attaching side 611A of the upper base layer 61A. The lower plate component 70A comprises a lower base layer 71A, a second metal layer 72A and a third metal layer 73A. The lower base layer 71A has an upper surface 711A and a lower surface 712A corresponding to the upper surface 711A. The second metal layer 72A is attached on the upper surface 711A of the lower base layer 71A. The third metal layer 73A is attached on the lower surface 712A of the lower base layer 71A.

It is worth mentioning that the first metal layer 62A, the second metal layer 72A and the third metal layer 73A may be, but not limited to, copper layers, such that it may utilize copper plating technology to attach the first metal layer 62A on the attaching side 611A of the upper base layer 61A, attach the second metal layer 72A on the upper surface 711A of the lower base layer 71A, and attach the third metal layer 73A on the lower surface 712A of the lower base layer 71A.

Figure 16A:
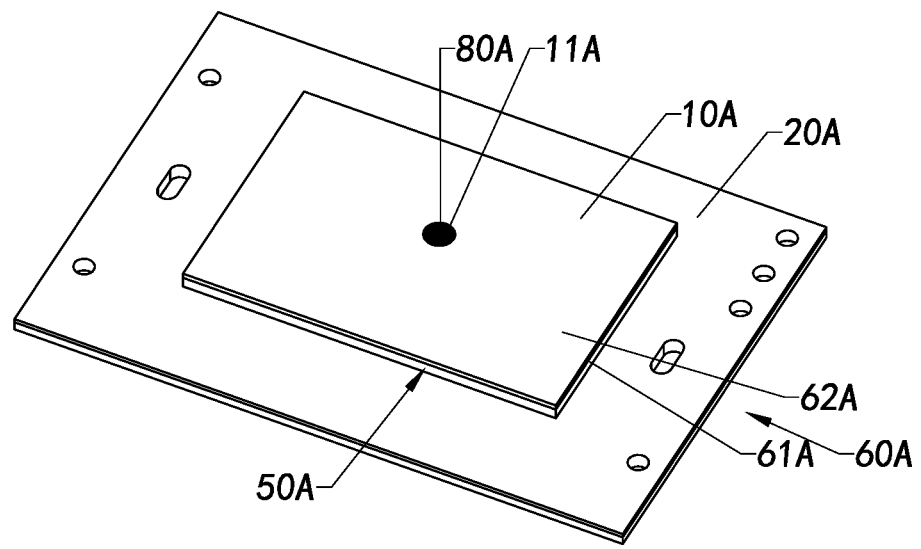
FIGS. 16A and 16B are perspective views illustrating the microwave detector according to the fourth alternative mode of the above preferred embodiment of the present invention when the shield member is removed therefrom.
Figure 16B:
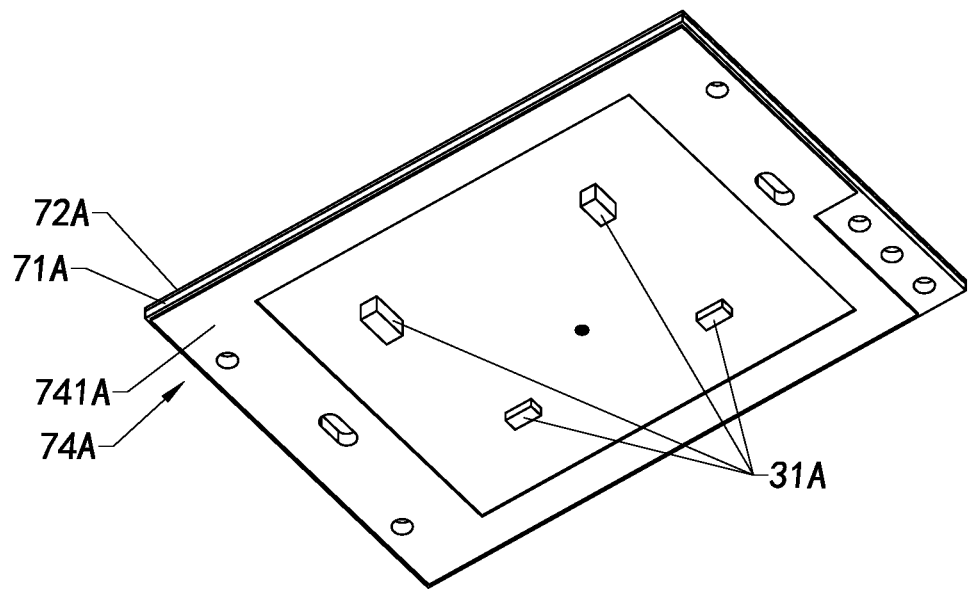
Figure 17:
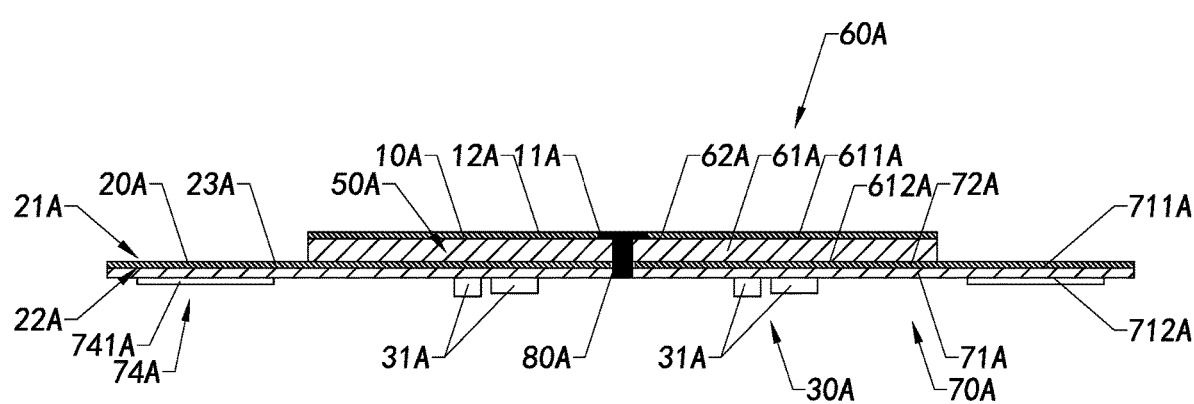
FIG. 17 is a sectional view illustrating the microwave detector according to the fourth alternative mode of the above preferred embodiment of the present invention when the shield member is removed therefrom.

Referring to FIG. 16, the driving circuit 30A is formed by means of, but not limited to, etching on a middle portion of the third metal layer 73A that is attached on the lower surface 712A of the lower base layer 71A. The etched third metal layer 73A forms an etched layer 74A and the etched layer 74A includes a peripheral portion 741A surrounding around the driving circuit 30A.

The mounting side 612A of the upper base layer 61A of the upper plate component 60A is attached and mounted on the second metal layer 72A. The driving circuit 30A is electrically connected with the first metal layer 62A, such that the first metal layer 62A forms the radiation source 10A, the second metal layer 72A forms the reference ground 20A, the upper base layer 61A forms the radiating clearance 50A, and the connecting site of the first metal layer 62A and the driving circuit 30A forms the feed point 11A of the radiation source 10A.

In the microwave detector of the present invention, after the mounting side 612A of the upper base layer 61A of the upper plate component 60A is attached on the second metal layer 72A, the driving circuit 30A and the first metal layer 62A are electrically and conductively connected through, for example, VIA technology or metallization VIA technology. Specifically, the microwave detector further comprises an electrical connection element 80A, formed and constructed through, for example, VIA technology or metallization VIA technology, so as to penetrate the upper plate component 60A and the lower plate component 70A and be electrically connected with the feed point 11A of the radiation source 10A and the driving circuit 30A, such that the feed point 11A of the radiation source 10A and the driving circuit 30A are electrically and conductively connected by the electrical connection element 80A.

In the microwave detector of the present invention, the reference ground 20A is formed by the second metal layer 72A attached on the upper surface 711A of the lower base layer 71A and the driving circuit 30A is formed by the third metal layer 73A attached on the lower surface 712A of the lower base layer 71A after etching, such that the lower base layer 71A divides and isolates the reference ground 20A and the driving circuit 30A, so as to maintain a spacing distance between the reference ground 20A and the driving circuit 30A.

In the microwave detector as illustrated in Figs and 14-17, the thickness of the lower base layer 71A is smaller than $1/128\lambda$, wherein $\lambda$ is the wavelength of the radiated wave produced by the microwave detector, such that the spacing distance between the reference ground 20A and the driving circuit 30A is smaller than $1/128\lambda$. Therefore, when the driving circuit 30A provides microwave excitation electrical signal from the feed point 11A of the radiation source 10A to the radiation source 10A, the radiation source 10A and the reference ground 20A coordinate with each other to allow the microwave detector to produce radiated wave. Accordingly, the configuring and arranging of the spacing distance between reference ground 20A and the driving circuit 30A to be smaller than $1/128\lambda$ can suppress stray electromagnetic radiation produced by the driving circuit 30A.

Referring to FIGS. 14-17, the microwave detector further comprises a shield member 100A having a shielded space 101A therein. The shield member 100A is configured and arranged to cover the driving circuit 30A so as to retain the driving circuit 30A within the shielded space 101A of the shield member 100A in order to suppress the stray electromagnetic radiation generated by the driving circuit 30 and block the stray electromagnetic radiation generated by the driving circuit 30A from radiating to the outside of the shield member 100A.

Figure 18:
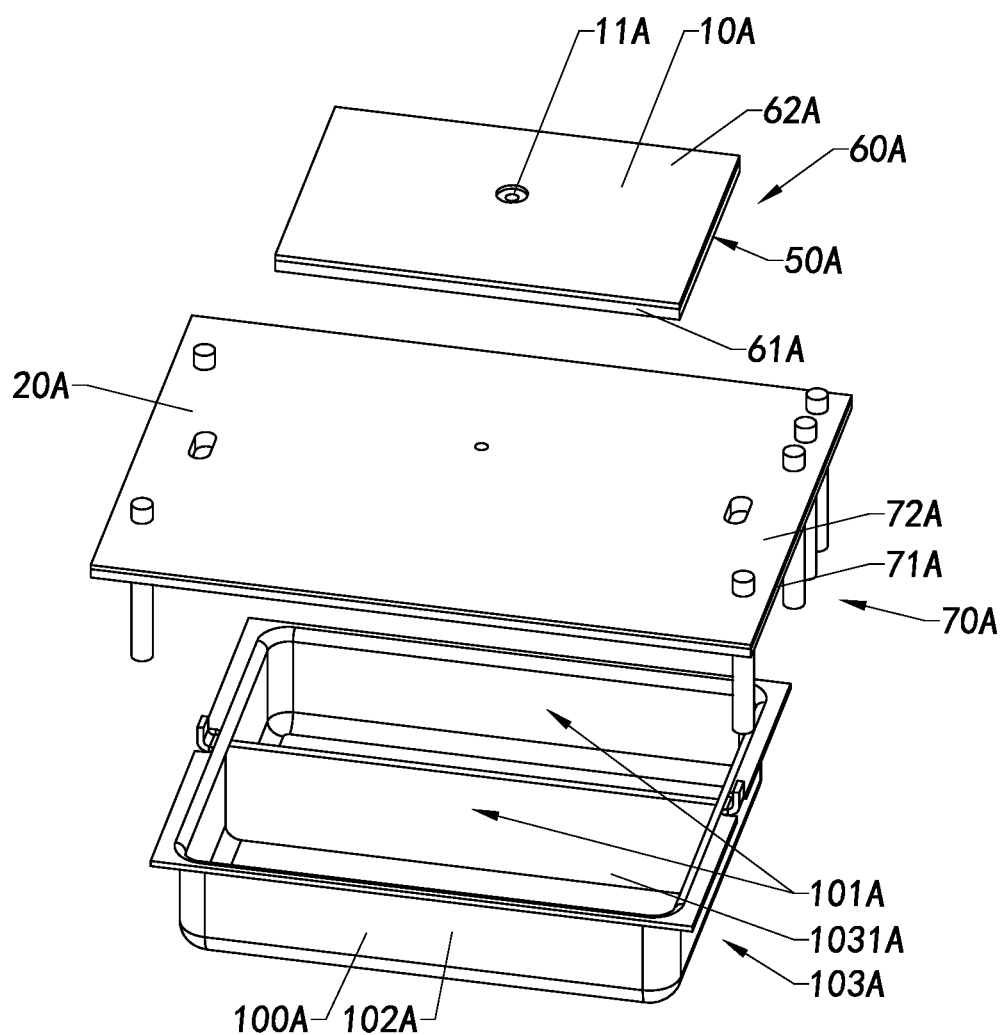
FIG. 18 is an exploded view of the microwave detector according to a fifth alternative mode of the above preferred embodiment of the present invention.

The differences between the microwave detector according to a sixth alternative mode of the above preferred embodiment of the present invention as illustrated in FIG. 18 and the microwave detector according to the fifth alternative mode of the above preferred embodiment of the present invention as illustrated in FIGS. 14-17 include that, for the microwave detector as illustrated in FIG. 18, the shield member 100A comprises at least two independent shielded spaces 101A formed therein and the driving circuit 30A comprises at least two circuit modules 31A, wherein the at least two shielded space 101A of the shield member 100A respectively accommodate the at least two circuit modules 31A of the driving circuit 30A, so as to divide and isolate the adjacent circuit modules of the driving circuit by the shield member 100A, so as to suppress the stray electromagnetic radiation generated by the driving circuit.

One skilled in the art should be able to understand that the above embodiments are just examples. Therefore, features of various embodiments may also be interchanged and combined in order to easily come out and achieve other implementations that the drawings of the present invention have not specified based on the disclosed contents of the present invention.

One skilled in the art will understand that the embodiment of the present invention as shown in the drawings and described above is exemplary only and not intended to be limiting. It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A microwave detector, comprising:
   a reference ground;
   a radiation source having a feed point;
   a driving circuit, electrically connected with said feed point of said radiating source, wherein said radiating source, said reference ground and said driving circuit are arranged in order along a thickness direction of said microwave detector, wherein said radiation source and said reference ground are separated and spaced so as to form and define a radiating gap between said radiation source and said reference ground, wherein a spacing distance between said reference ground and said driving circuit is greater than or equal to $1/128\lambda$, wherein $\lambda$ is a wavelength of a radiated wave of said microwave detector; and
   at least one set of suppression fence posts, wherein said suppression fence posts of said set of suppression fence posts are provided surrounding around said driving circuit in a such a manner that said suppression fence posts are respectively and spacingly arranged on side portions of said driving circuit.

2. The microwave detector, as recited in claim 1, further comprising an upper base layer and a lower base layer, wherein said upper base layer has an attaching side and a mounting side corresponding to said attaching side, wherein said radiation source is retained on said attaching side of said upper base layer, wherein said lower base layer has an upper surface and a lower surface corresponding to said upper surface, wherein said reference ground is retained on said upper surface of said lower base layer and said driving circuit is retained on said lower surface of said lower base layer, such that said lower base layer separates said reference ground and said driving circuit, wherein said mounting side of said upper base layer is mounted on said reference ground to allow said upper base layer forming said radiating gap.

3. The microwave detector, as recited in claim 2, further comprising an etched layer, which comprises a peripheral portion, layered on said lower surface of said lower base layer in such a manner that said peripheral portion surrounds said driving circuit, wherein said suppression fence posts of said set of suppression fence posts are extended from said peripheral portion toward a direction of said reference ground.

4. The microwave detector, as recited in claim 3, wherein said direct circuit comprises at least two circuit modules and said etched layer comprises at least a partition portion, layered on said lower surface of said lower base layer in a manner of isolating said circuit modules of said driving circuit, wherein said microwave detector further comprises at least one row of suppression dams, extended from said partition portion toward the direction of said reference ground in such a manner that said suppression dams are spacingly and intervally arranged with one another, so as to isolate said circuit modules of said driving circuit.

5. The microwave detector, as recited in claim 4, wherein each of said suppression fence posts of said set of suppression fence posts is extended from said peripheral portion to said reference ground, wherein each of said suppression dams of said row of suppression dams is respectively extended from said partition portion to said reference ground.

6. The microwave detector, as recited in claim 5, wherein said upper base layer is layered on said reference ground.

7. The microwave detector, as recited in claim 4, further comprising a shield member, which comprises a shield wall and at least a division member arranged on said shield wall, wherein at least two independent shielded spaces are formed and defined by said shield wall and said division member, wherein said shield member is arranged in such a manner that said shield wall is provided corresponding to said set of suppression fence posts and that said division member is provided corresponding to said row of suppression dams, so as to allow circuit modules of said driving circuit to be retained in said shielded spaces of said shield member respectively.

8. The microwave detector, as recited in claim 7, wherein a wave absorption material is provided in at least one of said shielded spaces to absorb stray electromagnetic radiation in order to deplete and reduce interference to said corresponding circuit module rendered by a secondary reflection of the stray electromagnetic radiation generated by said corresponding circuit module in said shielded space.

9. The microwave detector, as recited in claim 3, further comprising at least one row of suppression dams, extended from said lower surface of said lower base layer toward the direction of said reference ground in such a manner that said suppression dams are spacingly and intervally arranged with one another, so as to isolate adjacent circuit modules of said driving circuit.

10. The microwave detector, as recited in claim 9, wherein each of said suppression fence posts of said set of suppression fence posts is extended from said peripheral portion to said reference ground, wherein each of said suppression dams of said row of suppression dams is extended from said lower surface of said lower base layer to said reference ground.

11. The microwave detector, as recited in claim 3, wherein each of said suppression fence posts of said set of suppression fence posts is extended from said peripheral portion to said reference ground.

12. The microwave detector, as recited in claim 1, further comprising a shield member, wherein said shield member comprises a shield wall defining a shielded space in said shield member, wherein said shield member is arranged in such a manner that said shield wall is provided with respect to said set of suppression fence posts, so as to allow said driving circuit being retained in said shielded space which is further defined by said suppression fence posts and said reference ground.

13. The microwave detector, as recited in claim 12, wherein a wave absorption material is arranged in said shield space to absorb stray electromagnetic radiation in order to deplete and reduce any interference to said driving circuit rendered by a secondary reflection of the stray electromagnetic radiation generated by said driving circuit within said shielded space.

14. A manufacturing method of microwave detector, comprising the steps of:
(a) etching a first metal layer that is attached on an upper surface of a lower base layer, so as to allow said first metal layer to form a gap and etching a second metal layer that is attached on a lower surface of said lower base layer, so as to allow said second metal layer to form a driving circuit;
(b) forming at least a set of suppression fence posts surrounding around side portions of said driving circuit;
(c) allowing a mounting side of an upper base layer, which has a third metal layer attached on an attaching side thereof, be mounted on said first metal layer; and
(d) forming an electrical connection element extended from said third metal layer to said driving circuit through a notch of said first metal layer, wherein said third metal layer forms a radiation source of said microwave detector, said first metal layer forms a reference ground of said microwave detector, and said upper base layer forms a radiating gap of said microwave detector.

15. The manufacturing method, as recited in claim 14, wherein the step (c) is processed before the step (d), wherein said mounting side of said upper base layer is mounted on said first metal layer first and said set of suppression fence posts is formed around said side portions of said driving circuit.

16. The manufacturing method, as recited in claim 14, wherein in the step (a), said middle portion of second metal layer is etched, so as to turn a periphery of said second metal layer into a peripheral portion surrounding around said driving circuit, which allows said suppression fence posts of said set of suppression fence posts to spacingly and intervally extended from said peripheral portion to a direction of said first metal layer in the step (b).

17. The manufacturing method, as recited in claim 16, wherein in the step (a), said middle portion of second metal layer is etched, so as to turn said middle portion of said second metal layer into at least a partition portion to divide and isolate adjacent circuit modules of said driving circuit, such that, before the step (c), the manufacturing method further comprises a step of (e) forming at least a row of suppression dams from said partition portion to said first metal layer.

18. The manufacturing method, as recited in claim 17, wherein the step (b) and the step (e) are processed at the same time to simultaneously form said set of suppression fence posts and said row of suppression dams through metallization VIA technology.

19. The manufacturing method, as recited in claim 16, wherein, before the step (c), further comprising a step of (f) forming at least a row of suppression dams from said lower surface of the lower base layer to a direction of said first metal layer so as to divide and isolate adjacent circuit modules of said driving circuit.

20. The manufacturing method, as recited in claim 18, wherein the step (b) and the step (f) are processed at the same time to simultaneously form said set of suppression fence posts and said row of suppression dams through metallization VIA technology.

21. The manufacturing method, as recited in claim 20, further comprising a step of:

(g) arranging and covering a shield member on said driving circuit such that a shield wall of said shield member is arranged corresponding to said set of suppression fence posts.

22. The manufacturing method, as recited in claim 21, further comprising a step of:
(h) arranging and covering a shield member on said driving circuit such that a shield wall of said shield member is arranged corresponding to said set of the suppression fence posts and that a division member is arranged corresponding to said row of suppression dams.

23. A stray electromagnetic radiation suppression method of microwave detector, comprising the steps of:
(A) arranging at least a set of suppression fence posts surrounding a driving circuit of said microwave detector around side portions of said driving circuit; and
(B) preventing stray electromagnetic radiation generated by said driving circuit from radiating to a direction of said side portions of said driving circuit with a set of suppression fence posts when a microwave excitation electrical signal is provided from a feed point of a radiation source of said microwave detector to said radiation source by said driving circuit.

24. The stray electromagnetic radiation suppression method, as recited in claim 23, further comprising a step of:
(C) dividing and isolating adjacent circuit modules of said driving circuit so as to suppress stray electromagnetic radiation generated by said driving circuit and lower interference of the stray electromagnetic radiation generated by said driving circuit to said adjacent circuit modules.

25. The stray electromagnetic radiation suppression method, as recited in claim 24, wherein in the step (C), further comprising a step of providing at least a row of suppression dams between said adjacent circuit modules of said driving circuit, such that said row of suppression dams divides and isolates said adjacent circuit modules of said driving circuit.

26. The stray electromagnetic radiation suppression method, as recited in claim 25, wherein in the step (C), each of said circuit modules of said driving circuit is retained in an independent shielded space of a shield member, so as to utilize said shield member to divide and isolate said adjacent circuit modules of said driving circuit.

27. The stray electromagnetic radiation suppression method, as recited in claim 24, wherein in the step (C), each of said circuit modules of said driving circuit is retained in an independent shielded space of a shield member, so as to utilize said shield member to divide and isolate said adjacent circuit modules of said driving circuit.

28. A microwave detector, comprising:
a reference ground;
a radiation source having a feed point;
a driving circuit, electrically connected with said feed point of said radiating source, wherein said radiating source, said reference ground and said driving circuit are arranged in order along a thickness direction of said microwave detector, wherein said radiation source and said reference ground are separated and spaced so as to form and define a radiating gap between said radiation source and said reference ground, wherein a spacing distance between said reference ground and said driving circuit is smaller than $1/128\lambda$ wherein $\lambda$ is a wavelength of a radiated wave of said microwave detector.

29. The microwave detector, as recited in claim 28, further comprising a shield member arranged to cover said driving circuit.

30. The microwave detector, as recited in claim 29, wherein said shield member has at least two independent shielded spaces therein, wherein said driving circuit comprises at least two circuit modules, wherein said circuit modules of said driving circuit are respectively accommodated in said shielded spaces of said shield member.

31. The microwave detector, as recited in claim 30, wherein a wave absorption material is provided in at least one of said shielded space to absorb said stray electromagnetic radiation in order to deplete and reduce interference to said corresponding circuit module rendered by a secondary reflection of the stray electromagnetic radiation generated by said corresponding circuit module in said independent shielded space.

* * * * *